(12) United States Patent
Tokiwa

(10) Patent No.: US 7,457,483 B2
(45) Date of Patent: Nov. 25, 2008

(54) IMAGE PROCESSING APPARATUS, IMAGE PROCESSING PROGRAM AND STORAGE MEDIUM

(75) Inventor: Hiroyuki Tokiwa, Hachioji (JP)

(73) Assignee: Olympus Corporation, Tokyo (JP)

( * ) Notice: Subject to any disclaimer, the term of this patent is extended or adjusted under 35 U.S.C. 154(b) by 669 days.

(21) Appl. No.: 11/052,730

(22) Filed: Feb. 7, 2005

(65) Prior Publication Data

US 2005/0174589 A1 Aug. 11, 2005

(30) Foreign Application Priority Data

Feb. 9, 2004 (JP) ............................. 2004-032020
Mar. 9, 2004 (JP) ............................. 2004-066039

(51) Int. Cl.
*G06K 9/32* (2006.01)
(52) U.S. Cl. ...................... 382/298; 382/103; 382/282; 358/1.2; 358/537
(58) Field of Classification Search ................ 382/103, 382/235, 243, 282, 298; 358/1.2, 537, 538
See application file for complete search history.

(56) References Cited

U.S. PATENT DOCUMENTS

| | | | | | |
|---|---|---|---|---|---|
| 5,111,103 | A | * | 5/1992 | DuBrucq | 313/2.1 |
| 5,339,412 | A | * | 8/1994 | Fueki | 707/104.1 |
| 5,625,759 | A | * | 4/1997 | Freeman | 358/1.15 |
| 5,802,361 | A | * | 9/1998 | Wang et al. | 382/217 |
| 6,353,448 | B1 | * | 3/2002 | Scarborough et al. | 715/744 |
| 6,457,030 | B1 | * | 9/2002 | Adams et al. | 715/239 |
| 6,590,573 | B1 | * | 7/2003 | Geshwind | 345/419 |
| 6,744,935 | B2 | * | 6/2004 | Choi et al. | 382/305 |
| 6,856,414 | B1 | * | 2/2005 | Haneda et al. | 358/1.15 |
| 6,996,276 | B2 | * | 2/2006 | Liu et al. | 382/218 |
| 7,146,575 | B2 | * | 12/2006 | Manolis et al. | 715/838 |

FOREIGN PATENT DOCUMENTS

JP 2000-30039 1/2000

* cited by examiner

*Primary Examiner*—Yosef Kassa
(74) *Attorney, Agent, or Firm*—John C. Pokotylo; Straub and Pokotylo

(57) ABSTRACT

There is disclosed an image processing program causing a computer to perform the following operations setting image processing executed for a processing target image as application image processing, setting a plurality of predetermined processing parameter values used in the application image processing, executing the application image processing based on the parameter values to generate a plurality of processing result images, generating reduced images of the processing result images, displaying the reduced images, selecting one of reduced images, deciding the processing parameter values of the processing result image corresponding to the selected reduced image as a processing parameter values of the application image processing, setting the processing result image corresponding to the selected reduced image as a new processing target image, setting another kind of image processing as new application image processing, and repeatedly executing the process from the parameter setting processing to the image processing setting processing.

20 Claims, 18 Drawing Sheets

FIG. 2

| Image processing item | min | max | step | default | default Priority | priority | value |
|---|---|---|---|---|---|---|---|
| Hue | -5 | +5 | 1 | 0 | 1 | 3 | |
| Chroma | -100 | +100 | 10 | 0 | 2 | 1 | |
| Brightness | 0 | +100 | 10 | 0 | 3 | 2 | |
| ... | ... | ... | ... | ... | ... | ... | ... |
| Number N of items | Iproc (N, min) | Iproc (N, max) | Iproc (N, step) | Iproc (N, default) | Iproc (N, Priority) | Iproc (N, Priority) | Iproc (N, value) |

F I G. 5

US 7,457,483 B2

IMAGE PROCESSING APPARATUS, IMAGE PROCESSING PROGRAM AND STORAGE MEDIUM

CROSS-REFERENCE TO RELATED APPLICATIONS

This application is based upon and claims the benefit of priority from prior Japanese Patent Applications No. 2004-032020, filed Feb. 9, 2004; No. 2004-066039, filed Mar. 9, 2004, the entire contents of both of which are incorporated herein by reference.

BACKGROUND OF THE INVENTION

1. Field of the Invention

The present invention relates to an image processing technology, and more particularly to an image processing technology capable of easily deciding a desired image processing method when an original image is subjected to image processing.

2. Description of the Related Art

As a method of subjecting an original image to image processing, there has conventionally been known a method of displaying the original image on a display device, operating slide bars corresponding to a plurality of image processing parameters, and checking effects of the image processing by an image displayed in a preview.

According to this method, however, only an image processing result uniquely decided by each parameter is displayed in the preview. Thus, comparison with image processing results by the other parameter values is difficult, causing a problem that checking of image processing effects is difficult.

To solve the problem, a technology capable of easily checking image processing effects has been proposed. According to this technology, using a predetermined color adjustment parameter as a reference, a plurality of thumbnail images subjected to different color processing operations by parameters in the vicinity of the color adjustment parameter are generated (Jpn. Pat. Appln. KOKAI Publication No. 2000-30039).

BRIEF SUMMARY OF THE INVENTION

A first aspect of the present invention is directed to an image processing program which executes a plurality of image processing operations of different kinds for an image, the image processing program causing a computer to perform the following operations: first image setting processing which sets an original image as a processing target image, first image processing setting processing which sets image processing executed for the processing target image as application image processing, parameter setting processing which sets a plurality of predetermined processing parameter values used in the application image processing, processing result image generation processing which executes the application image processing for the processing target image based on the parameter values set in the parameter setting processing to generate a plurality of processing result images, reduced image generation processing which generates reduced images of the processing result images, reduced image display processing which displays the reduced images generated in the reduced image generation processing, reduced image selection processing which selects one of the plurality of reduced images displayed in the reduced image display processing, parameter value deciding processing which decides the processing parameter values of the processing result image corresponding to the reduced image selected in the reduced image selection processing as a processing parameter values of the application image processing, second image setting processing which sets the processing result image corresponding to the reduced image selected in the reduced image selection processing as a new processing target image, second image processing setting processing which sets another kind of image processing to be executed next as new application image processing, and repeated execution control processing which repeatedly executes the process from the parameter setting processing to the second image processing setting processing.

A second aspect of the present invention is directed to an image processing apparatus which executes a plurality of image processing operations of different kinds for an image, comprising: a first image setting unit which sets an original image as a processing target image, a first image processing setting unit which sets image processing executed for the processing target image as application image processing, a parameter setting unit which sets a plurality of predetermined processing parameter values used in the application image processing, a processing result image generation unit which executes the application image processing for the processing target image based on the parameter values set by the parameter setting unit to generate a plurality of processing result images, a reduced image generation unit which generates reduced images of the processing result images, a reduced image display unit which displays the reduced images generated by the reduced image generation unit, a reduced image selection unit which selects one of the plurality of reduced images displayed by the reduced image display unit, a parameter value deciding unit which decides the processing parameter values of the processing result image corresponding to the reduced image selected by the reduced image selection unit as a processing parameter values of the application image processing, a second image setting unit which sets the processing result image corresponding to the reduced image selected by the reduced image selection unit as a new processing target image, a second image processing setting unit which sets another kind of image processing to be executed next as new application image processing, and a repeated execution control unit which repeatedly executes the process from the processing of the parameter setting unit to the processing of the second image processing setting unit.

A third aspect of the present invention is directed to a storage medium recording an image processing program which executes a plurality of image processing operations of different kinds for an image, the program causing a computer to perform the following operations: first image setting processing which sets an original image as a processing target image, first image processing setting processing which sets image processing executed for the processing target image as application image processing, parameter setting processing which sets a plurality of predetermined processing parameter values used in the application image processing, processing result image generation processing which executes the application image processing for the processing target image based on the parameter values set in the parameter setting processing to generate a plurality of processing result images, reduced image generation processing which generates reduced images of the processing result images, reduced image display processing which displays the reduced images generated in the reduced image generation processing, reduced image selection processing which selects one of the plurality of reduced images displayed in the reduced image display processing, parameter value deciding processing which decides the processing parameter values of the processing result image corresponding to the reduced image selected in the reduced image selection processing as a processing parameter values of the application image processing, second image setting processing which sets the processing result image corresponding to the reduced image selected in the reduced image selection processing as a new processing target image, second image processing setting processing which sets another kind of image processing to be executed next as new application image processing, and repeated execution control processing which repeatedly executes the process from the parameter setting processing to the second image processing setting processing.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a view showing a method of deciding image processing parameters;

FIG. 5 is a view showing a structure of an image processing item table;

DETAILED DESCRIPTION OF THE INVENTION

First Embodiment

According to an image processing technology of an embodiment of the present invention, a user performs an operation to process an image based on an image processing window displayed on a display unit of an image processing apparatus.

Figure 1:
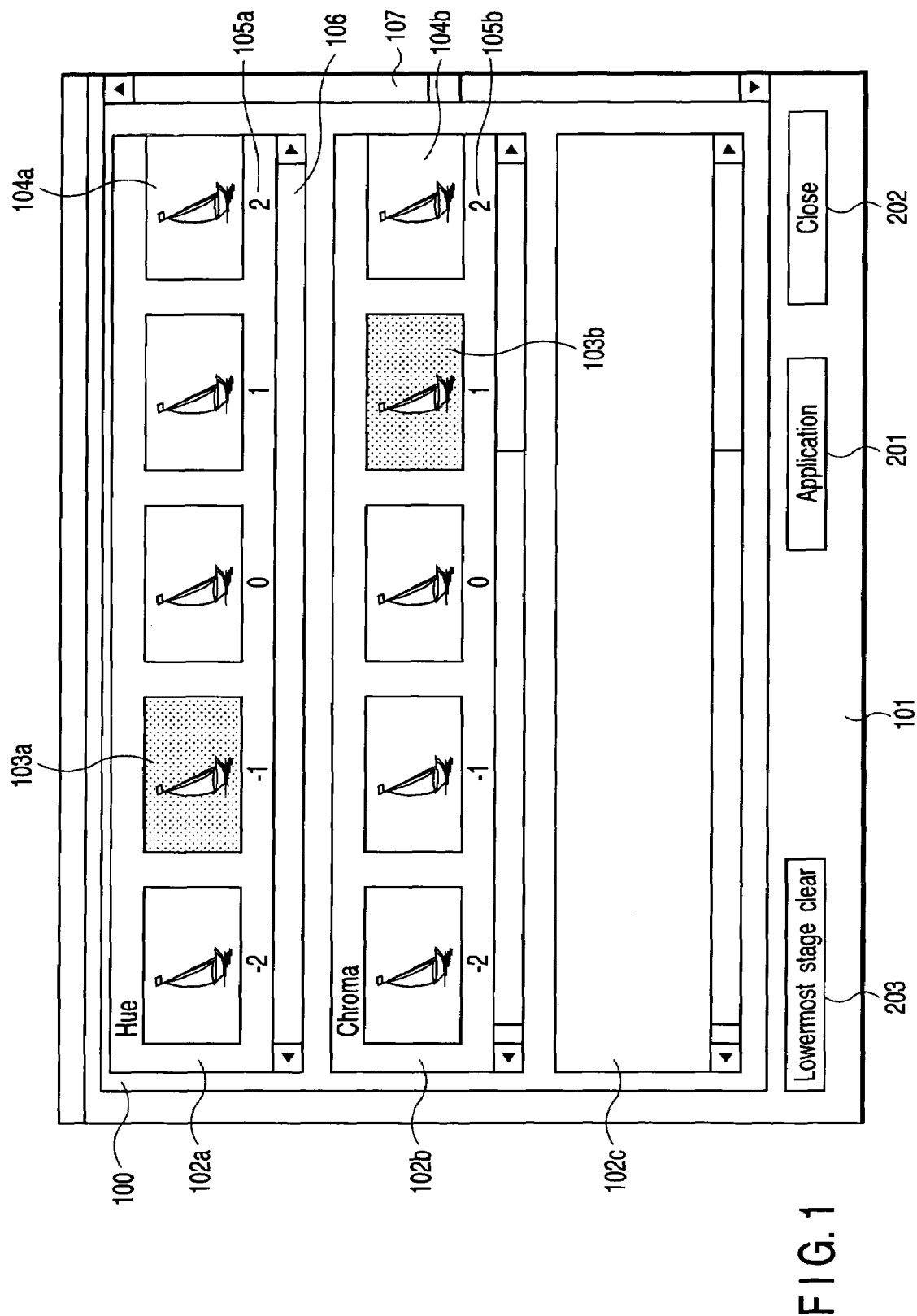
FIG. 1 is a view showing contents of an image processing window of an image processing apparatus according to a first embodiment of the present invention.

FIG. 1 is a view showing contents of an image processing window of an image processing apparatus according to a first embodiment of the invention.

The image processing window comprises an image area 100 for selecting image processing conditions or displaying an image processing result, and a tool button area 101 having a plurality of operation buttons arranged therein.

In the image area 100, image processing result display areas 102 (102a, 102b, and 102c) of plural stages can be displayed. Each of the image processing result display areas 102, 102b and 102c is disposed for each image processing item such as a hue or a chroma. A plurality of processing result images 104 (104a, 104b) are displayed in each of the image processing result display areas 102, 102b and 102c.

The processing result image 104b is an image obtained as a result of setting a processing result image 103a selected in the image processing result display area 102a of a stage one step higher as a processing target image, and subjecting the processing target image to image processing corresponding to the image processing display area 102b by using each image processing parameter 105b.

When the processing result image 104 cannot be displayed on one screen of the display area, it can be checked by operating a scroll bar 106 disposed in each image processing result display area 102. The image processing result display area 102 can be checked by operating a scroll bar 107 disposed in an image processing window.

In the tool button area 101, an application button 201, a close button 202 and a lowermost stage clear button 203 are displayed. The image processing can be executed by these operation buttons.

Next, referring to FIG. 1, an outline of an image processing procedure will be described.

When the user opens the image processing window, a first image processing item name, e.g., a hue, is displayed in the image processing result display area 102a of a first stage, and a parameter value of the image processing item is sequentially changed to display a plurality of processing result images 104a applied to the processing target image. This processing target image is set as an original image designated by the user based on a certain method.

When the user selects a desired image 103a from the plurality of processing result images 104a, the image processing result display area 102b of a second stage displaying a second image processing item name, e.g., a chroma, is displayed. In this image processing result area 102b of the second stage, a parameter value of the second image processing item name is sequentially changed to display a plurality of processing result images 104b applied to the image 103a selected in the image processing result display area 102a of the first stage.

When the user selects a desired image 103b from the plurality of processing result images 104b, the image processing result display area 102c of a third stage displaying a third image processing item name, e.g., brightness, is displayed. Thereafter, processing result images are similarly displayed, and an image is selected therefrom and processed.

The user sequentially selects images 103 from the plurality of processing result images 104 in the image processing result display areas 102 of the plural stages to display new image processing result areas 102. However, when all the image processing result display areas 102 cannot be displayed, the scroll bar 107 is displayed. By this scroll bar 107, processing history of the images selected thus far can be quickly checked. Additionally, by returning to the image processing result display area 102 in which the image has been selected once, an image 103 can be selected again from the processing result images 104.

The application button 201 is permitted to be operated after the image 103a is selected in the image processing result display area 102a of the first stage. By pressing this application button 201, image processing is performed for the original image by using image processing conditions selected thus far. By pressing the lowermost stage clear button 203, the image processing result display areas 102 can be deleted sequentially from the lowermost stage. When the close button 202 is pressed, the image processing window is closed to finish the image processing operation.

Subsequently, referring to FIG. 2, a method of deciding an image processing parameter in the image processing operation will be described.

Figure 2:
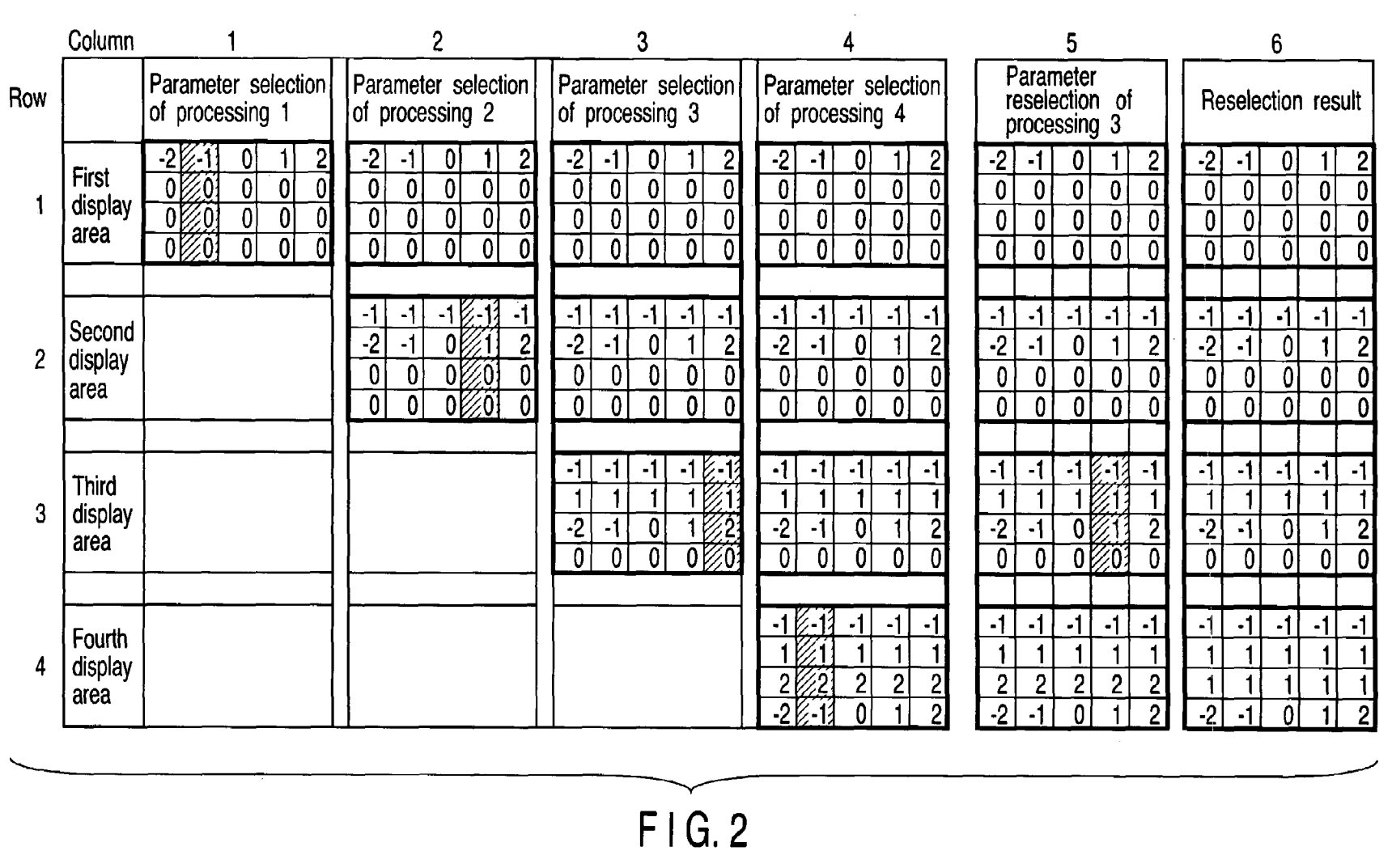

In FIG. 2, a longitudinal direction, i.e., a row direction, corresponds to the image processing result display area 102 of each stage, and a horizontal direction, i.e., a column direction, corresponds to a selection operation step of the processing image 104 in the image processing result display area corresponding to each image processing item. Thus rows and columns form plural frames. A set of longitudinally arrayed numerals in a frame represent image processing parameters of a plurality of image processing operations executed for one processing result image 104 displayed in the image processing result display area 102. An uppermost numeral is an image processing parameter of a first image processing operation, and a second numeral is an image processing parameter of a second image processing operation.

The 1st row and the 1st column of FIG. 2 indicate that predetermined image processing parameters of a first image processing operation are −2, −1, 0, 1, and 2 for the original image as a processing target, image processing parameters of second to fourth image processing operations are all fixed at 0, and the first to fourth image processing operations are sequentially carried out.

It is to be noted that in the case of executing image processing for an image of a JPEG or BMP format, for example, an image processing parameter of a certain image processing item may be set to 0 indicating that the image processing item is not executed if the item allows the original image to be as it is. However, in the case of image processing in which an image is generated from photographing data obtained in an RAW form by a digital camera or the like, even if the image processing parameter is 0, the image processing item must be executed by actually setting the image processing parameter to 0.

Five processing result images 104a obtained as a result of the image processing are displayed in the image processing result display area 102a of the uppermost stage (first stage) in FIG. 1. Here, when the user selects a processing result image 103a processed by an image processing parameter (−1), the image processing result display area 102b of the second stage is newly displayed.

In the 2nd row and the 2nd column of FIG. 2, a set of four numerals of each column in a frame represent image processing parameters applied to processing result images 104b in the image processing result display area 102b of the second stage. That is, an image processing parameter of the first image processing item is (−1), and a plurality of processing result images 104b processed by predetermined image processing parameters (−2, −1, 0, 1, and 2) of the second image processing item are displayed. Here, when the user selects a processing result image 103b processed by the image processing parameter (1), the image processing result display area 102c of the third stage is newly displayed.

The 1st row and the 2nd column of FIG. 2 indicate a set of image processing parameters of the processing result images 104a displayed in the image processing result area 102a of the first stage.

In the 3rd row and the 3rd column of FIG. 2, a set of four numerals of each column in a frame indicate states of processing result images 104c in the image processing result display area 102c of the third stage. For example, an image processing parameter of the first image processing item is (−1), an image processing parameter of the second image processing item is (1), and a plurality of processing result images processed by predetermined image processing parameters (−2, −1, 0, 1, and 2) of the third image processing item are displayed. Here, for example, when the user selects a processing result image processed by the image processing parameter (2) of the third image processing item, the image area 100 is scrolled to newly display the image processing result display area 102 of the fourth stage.

The 1st row and the 3rd column of FIG. 2 indicate a set of image processing parameters of processing result images 104a displayed in the image processing result display area 102a of the first stage when the processing result images 104 up to the third stage are displayed in FIG. 1. The 2nd row and the 3rd column of FIG. 2 indicate a set of image processing parameters of processing result images 104b displayed in the image processing result area 102b of the second stage when the processing result images 104 up to the third stage are displayed in FIG. 1.

In the 4th row and the 4th column of FIG. 2, a set of numerals in a frame indicate states of processing result images in the image processing result display area 102 of the fourth stage. That is, a image processing parameter of the first image processing item is (−1), an image processing parameter of the second image processing item is (1), an image processing parameter of the third image processing item is (2), and a plurality of processing result images processed by predetermined image processing parameters (−2, −1, 0, 1 and 2) of the fourth image processing item are displayed.

Here, when an image displayed in the image processing result display area 102 of the fourth stage is selected, an image processing parameter of a fourth image processing operation corresponding to the image is specified. Then, for the original image, the first to fourth image processing operations are sequentially performed based on corresponding image processing parameters. FIG. 2 shows selection of an image second from the left of the image processing result display area 102 of the fourth stage. A corresponding image processing parameter of the fourth image processing operation is −1.

Rows of the 5th column of FIG. 2 indicate states of processing result images in the image processing result display areas 102 of the first to fourth stage. Here, when the user changes selection to the processing result image processed by the image processing parameter (1) in the image processing result display area 102c of the third stage, as indicated by a set of numerals in a frame of the 4th row and the 6th column of FIG. 2, in the image processing result display area 102 of the fourth stage, an image processing parameter of the first image processing item is (−1), an image processing parameter of the second image processing item is (1), an image processing parameter of the third image processing item is (1), and a plurality of processing result images 104 processed by predetermined image processing parameters (−2, −1, 0, 1, and 2) of the fourth image processing item are displayed.

Figure 3:
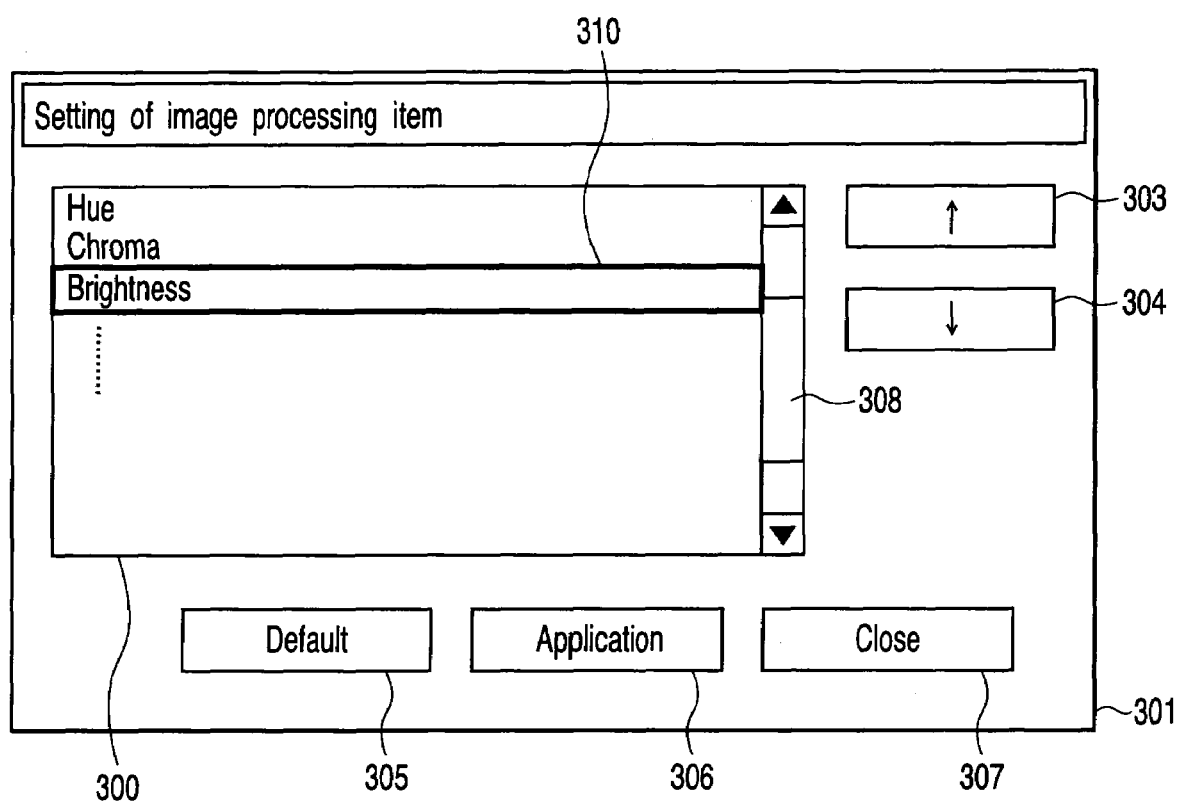
FIG. 3 is a view showing a window for setting image processing items.

Next, setting of a processing sequence of image processing items will be described. FIG. 3 is a view showing an image processing item setting window.

The image processing item setting window comprises an area 300 for displaying image processing items and a processing sequence thereof, and a tool button area 301 having a plurality of operation buttons arranged therein.

In the tool button area 301, upper and lower operation buttons 303, 304, a default button 305, an application button 306, and a close button 307 are disposed. When an image processing item displayed in the display area 300 is selected, the image processing item is surrounded with a selection frame 310, and a scroll bar 308 is displayed when the image processing item is not accommodated in one screen. By these operation buttons, image processing items and a processing sequence thereof can be set.

Next, referring to FIG. 3, an outline of a method of setting a processing sequence of image processing items will be described.

When the user opens the image processing item setting window, a list of image processing items is displayed in the display area 300. If items to be displayed are many and all the items cannot be displayed on one screen, the scroll bar 308 is displayed.

When the user selects one of the image processing items in the display area 300, the selected image processing item is surrounded with the selection frame 310, thereby allowing operations of the upper and lower operation buttons 303, 304 to change the sequence of the selected image processing item. The user can set an image processing sequence by using the upper and lower operation buttons 303, 304.

The default button 305 returns the image processing sequence to a default state, i.e., a preset sequence. The image processing sequence is established by operating the application button 306, and the image processing sequence setting window is finished by operating the close button 307. It is to be noted, however, that changed contents are not reflected if the close button 307 is pressed without pressing the application button 306.

Subsequently, a configuration of an image processing apparatus for realizing the aforementioned image processing method and a main processing sequence thereof will be described.

Figure 4:
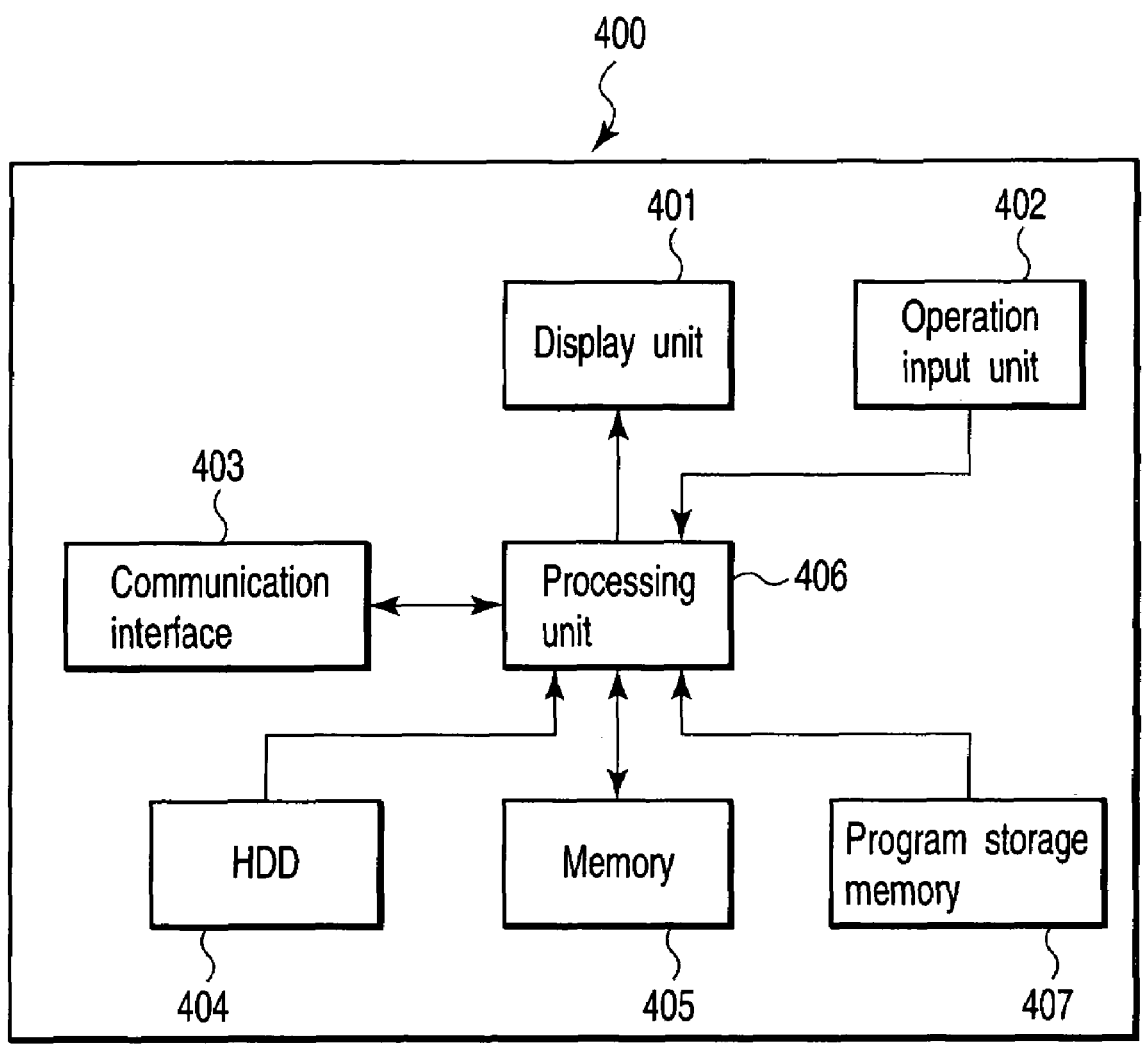
FIG. 4 is a view showing a configuration of the image processing apparatus.
Figure 6:
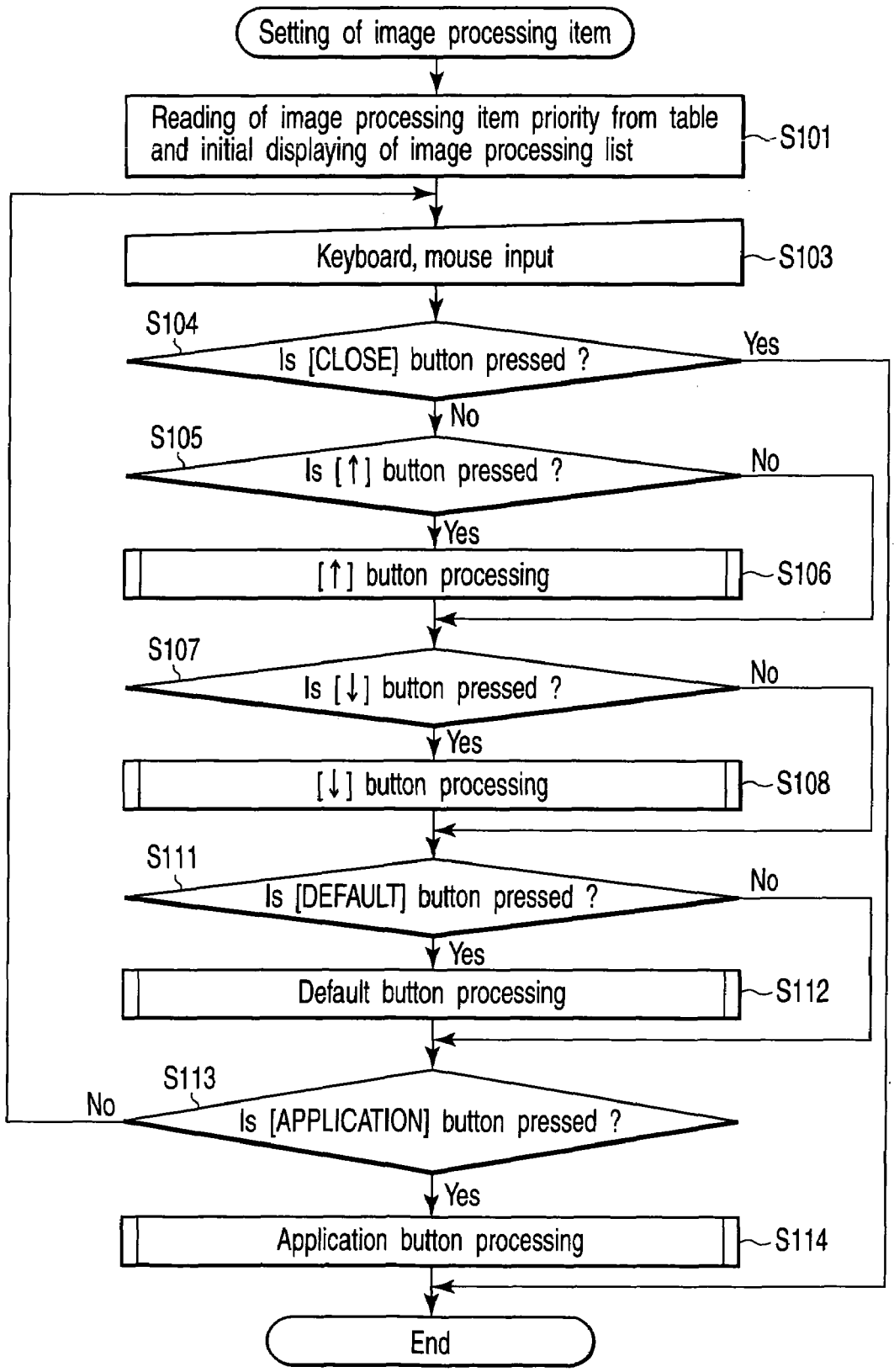
FIG. 6 is a flowchart showing a procedure for setting image processing items and a processing sequence thereof.

FIG. 4 is a view showing a configuration of an image processing apparatus 400. The image processing apparatus 400 comprises a display unit 401, an operation input unit 402, a communication interface 403, an HDD 404, a memory 405, a processing unit 406, and a program storage memory 407.

The display unit 401 is a CRT or TFT liquid crystal display for displaying an image processing window. The operation input unit 402 is an input device such as a keyboard or a mouse for receiving an operation instruction input from the user.

The communication interface 403 is an interface for giving/receiving information to/from an external device (not shown) through communication. The HDD 404 is a storage medium for storing various data. The memory 405 stores image data. The processing unit 406 is in overall control of an operation of the image processing apparatus 400. The program storage memory 407 stores programs for controlling functions of the image processing apparatus 400.

FIG. 5 is a view showing a structure of an image processing item table used when image processing is performed at the image processing apparatus 400.

The image processing item table contains a minimum value (min), a maximum value (max), the number of steps (step), a default value (default), an image processing sequence (priority), and a parameter value (value) for each of image processing items (hue, chroma, brightness, . . . ).

The minimum value (min), the maximum value (max), the number of steps (step), and the default value (default) are fixed values used for initial setting of image processing. The image processing sequence (priority) indicates a sequence of executing image processing. The parameter value (value) is an image processing parameter decided based on selection of an image 103 from processing result images 104 by the user.

It is to be noted that this table is represented by a two-dimensional array of variables written in a lowermost section of FIG. 5 in which N denotes a maximum number of image processing items.

Next, referring to flowcharts of FIGS. 6 to 10, image processing items and a procedure of setting a processing sequence will be described.

When the user starts an image processing item setting operation from the operation input unit 402, in a step S101, the processing unit 406 reads image processing items (hue, chroma, brightness, . . . ) from the image processing item table shown in FIG. 5, and displays the image processing items (image processing list) in the display area 300 in sequence decided based on an image processing sequence default value (default priority).

Next, in a step S103, the process stands by until the user inputs an operation by using the keyboard, the mouse or the like, and executes processing in accordance with an input when the input is made.

In a step S104, when the close button 307 is operated, the image processing item setting window is closed to finish the processing.

Figure 7:
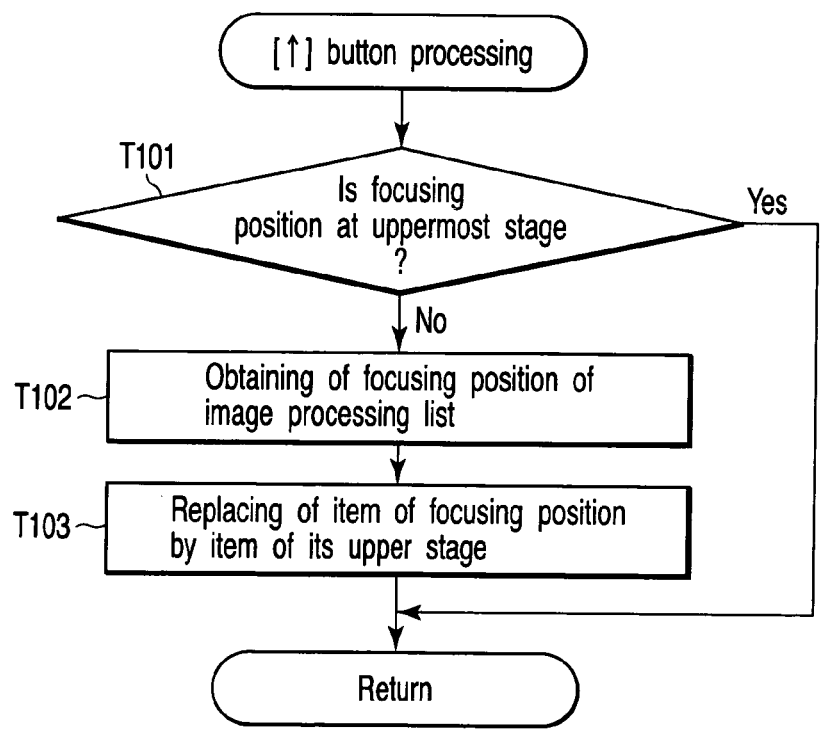
FIG. 7 is a schematic flowchart showing up-movement button processing.

In a step S105, when the upper operation button 303 is operated, up-movement button processing shown in FIG. 7 is executed in a step S106. In a step T101 of FIG. 7, investigation is carried out as to whether a focusing position is at an uppermost stage of the display area 300 or not. Here, the focusing position means a position of the selection frame 310. If the focusing position is not at the uppermost stage of the display area 300, in steps T102 and T103, a focusing position of an image processing list is obtained, an image processing item of the focusing position is replaced by an image processing item of an upper stage, and the process returns.

Figure 8:
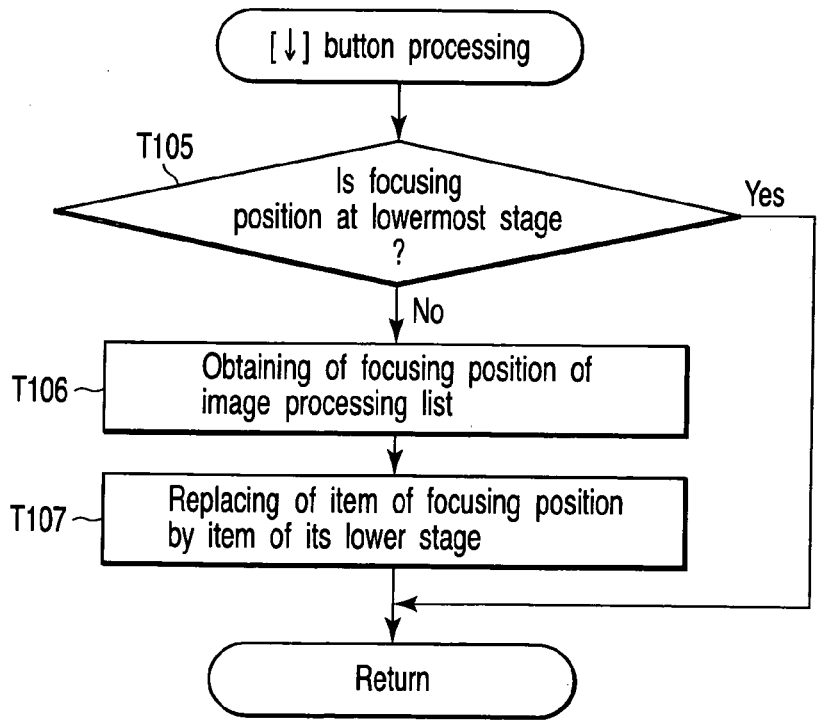
FIG. 8 is a schematic flowchart showing down-operation button processing.

Returning to FIG. 6, when the lower operation button 304 is operated in the step S107, lower operation button processing shown in FIG. 8 is executed in a step S108. In a step T105 of FIG. 8, investigation is carried out as to whether a focusing position is at a lowermost stage of the display area 300. If the focusing position is not at the lowermost stage of the display area 300, in steps T106 and T107, a focusing position of an image processing list is obtained, an image processing item of the focusing position is replaced by an image processing item of a lower stage, and the process returns.

Figure 9:
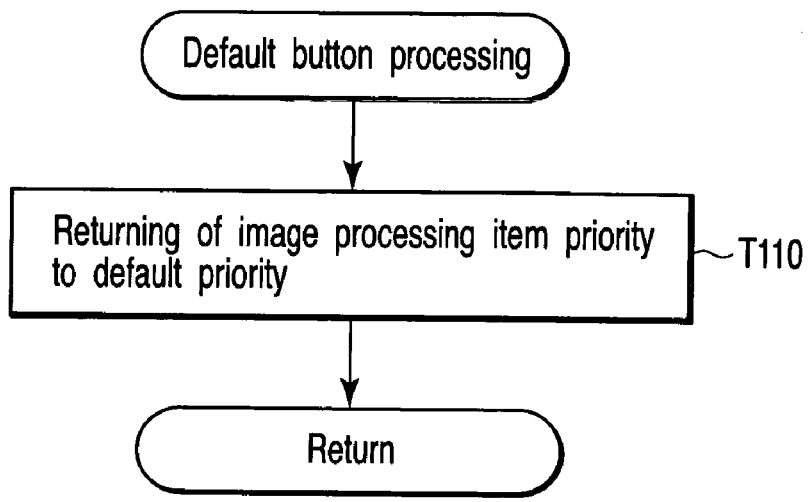
FIG. 9 is a schematic flowchart showing default button processing.

Returning to FIG. 6, when the default button 305 is operated in a step S111, default button processing shown in FIG. 9 is executed in a step S112. In a step T110 of FIG. 9, an image processing sequence (priority) of the image processing item table is replaced by an image processing sequence default value (default priority), and the process returns.

Figure 10:
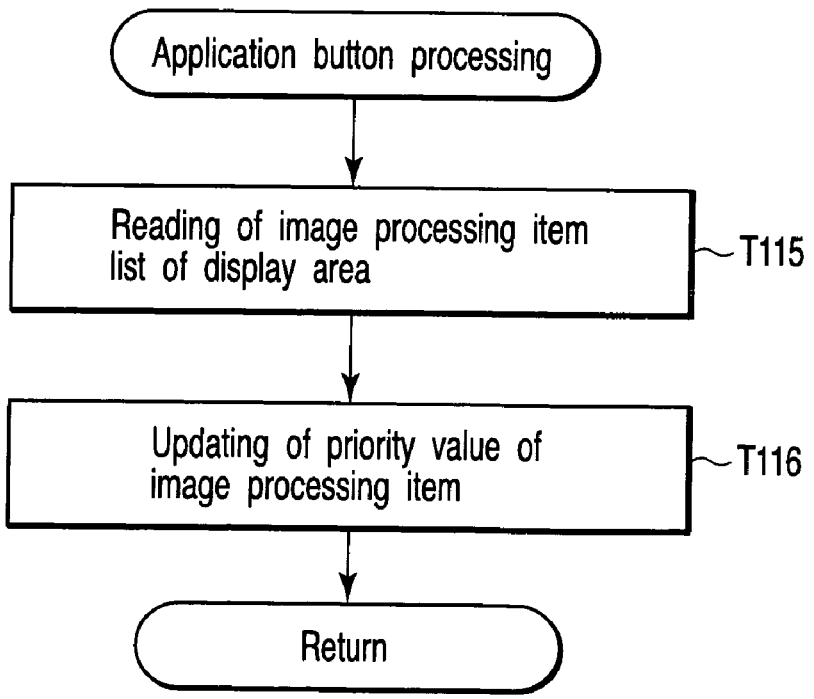
FIG. 10 is a schematic flowchart showing application button processing.

Returning to FIG. 6, when the application button 306 is operated in a step S113, application button processing shown in FIG. 10 is executed in a step S114. In a step T115 of FIG. 10, the image processing item list of the display area 300 is read. In a step T116, the image processing sequence (priority) of the image processing item table is updated in this sequence, and the process returns.

Returning to FIG. 6, after execution of processing in accordance with the operation inputs, a standby state is set to wait for an operation input from the user in the step S103 again. However, after execution of application button processing in a step S114, this image processing item setting processing is finished.

Next, an image processing procedure of the image processing apparatus of the embodiment will be described. It is to be noted that processing described below concerns main ones of image processing functions. Thus, even functions not described below, and the functions described above with reference to FIGS. 1 to 10 are included in the image processing functions.

Figure 11:
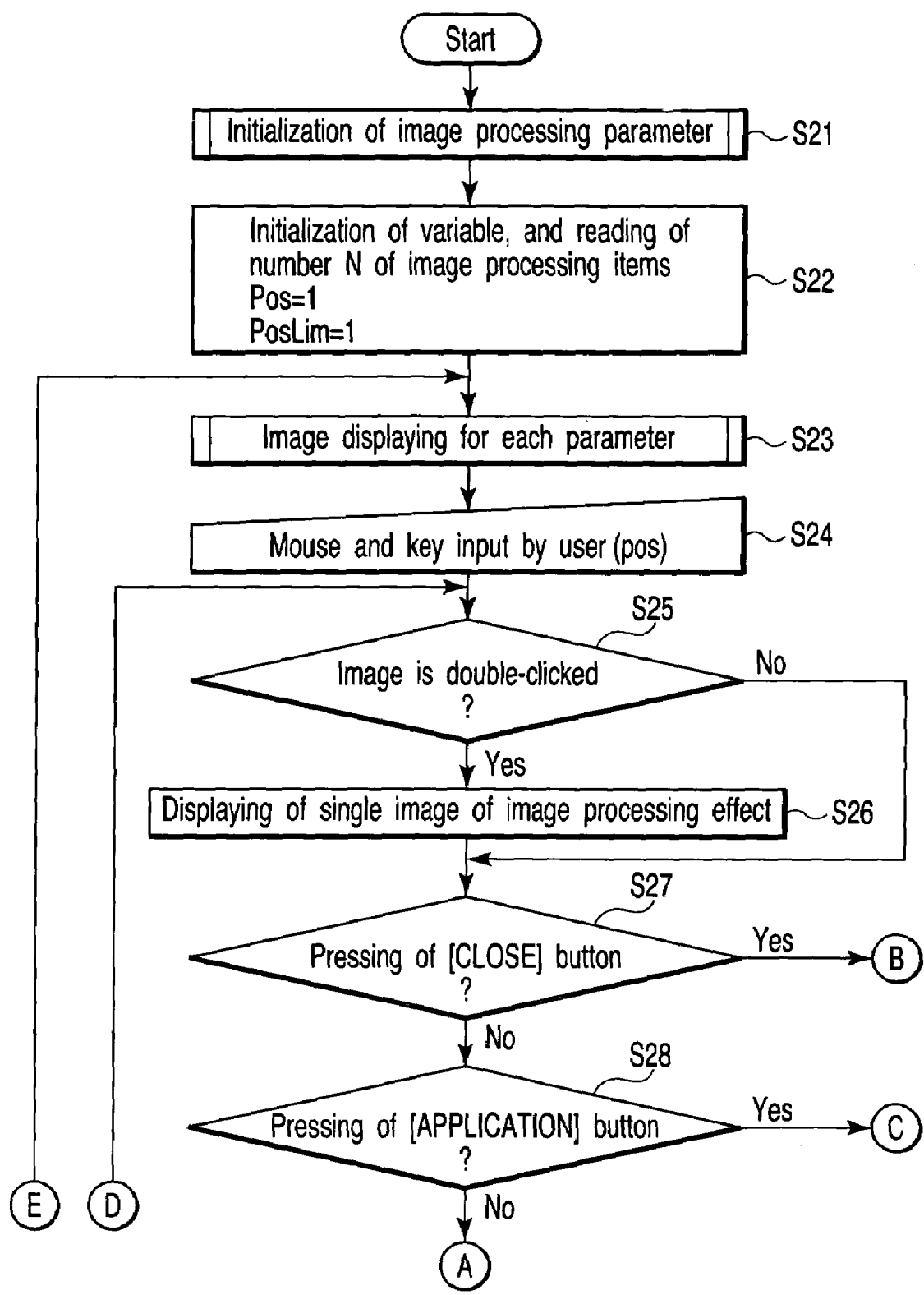
FIG. 11 is a flowchart schematically showing an image processing procedure.
Figure 12:
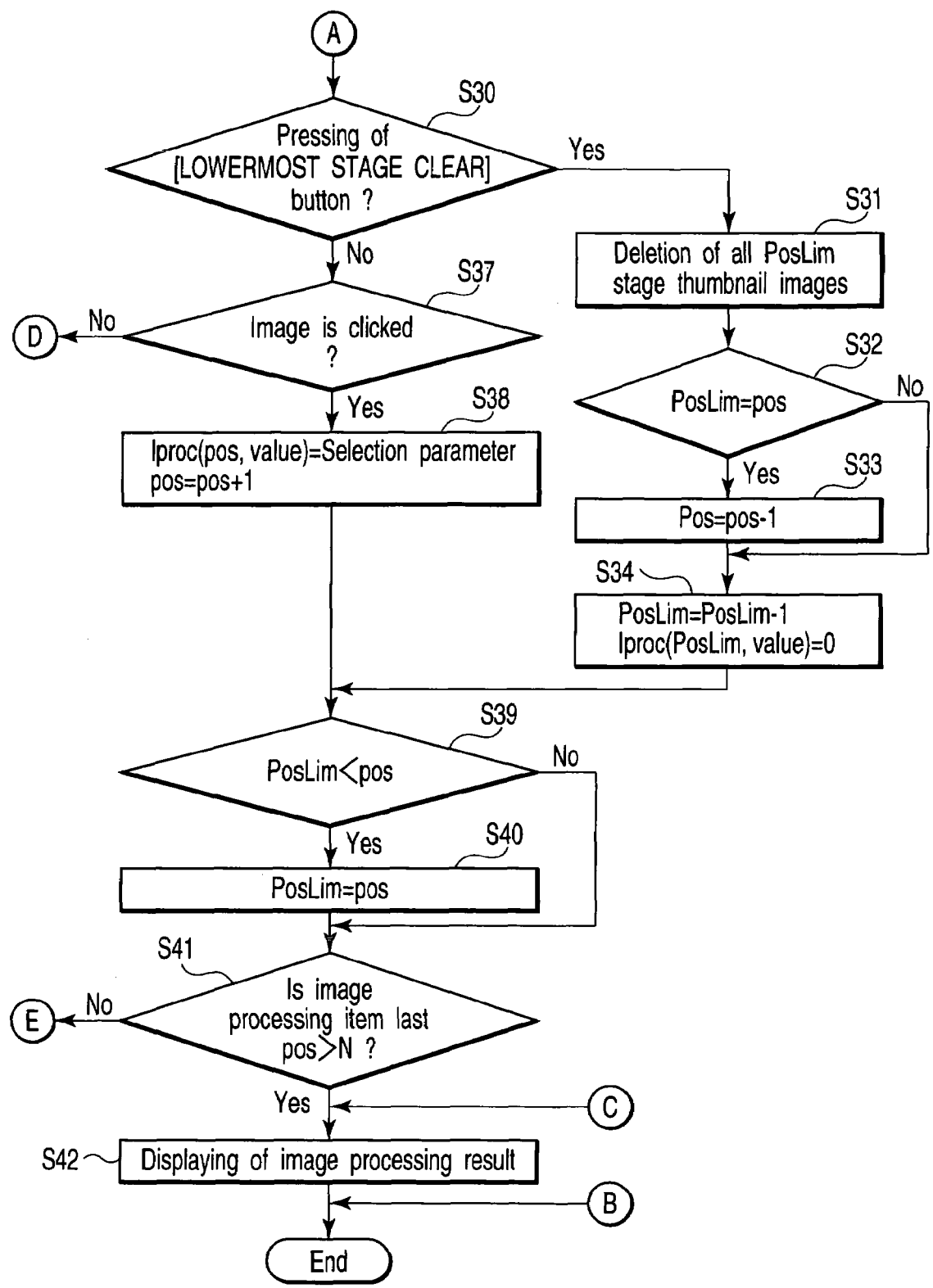
FIG. 12 is a flowchart schematically showing an image processing procedure.

FIGS. 11 and 12 are flowcharts schematically showing an image processing procedure.

Figure 13:
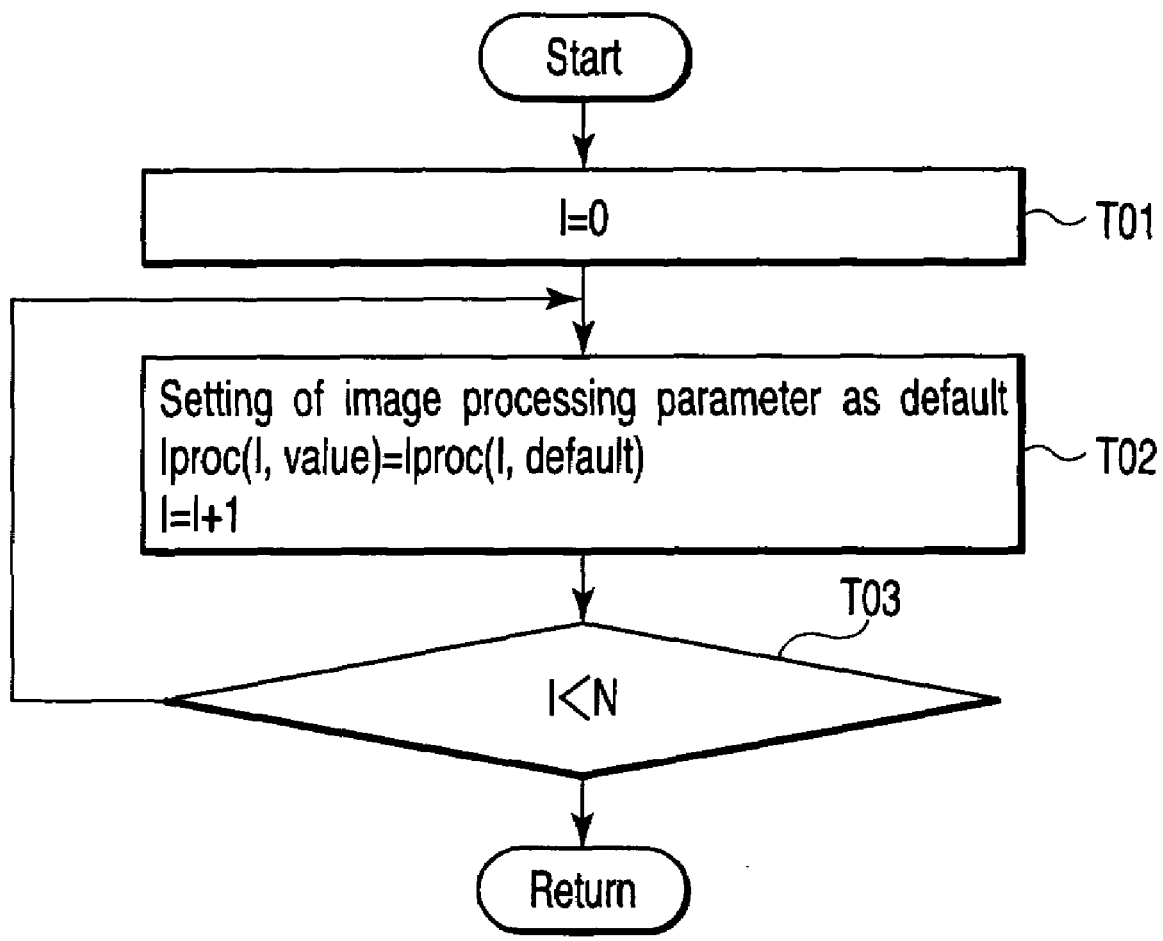
FIG. 13 is a flowchart showing a procedure for initializing processing.

When the user opens the image processing window, in a step S21, initialization processing of an image processing parameter shown in FIG. 13 is executed. According to this processing, as shown in steps T01 to T03 of FIG. 13, array data of the image processing item table is read, and a parameter value (value) is replaced by a default value (default).

In a step S22, variables used for the following processing are initialized. Here, the image processing parameter is changed, image processing result display areas 102 in which lists of processing result images 104 are displayed are counted to fist, second, . . . stages from above, and the image processing result display area 102 of a stage from which the user selects an image is referred to as a selection stage (Pos).

Figure 14:
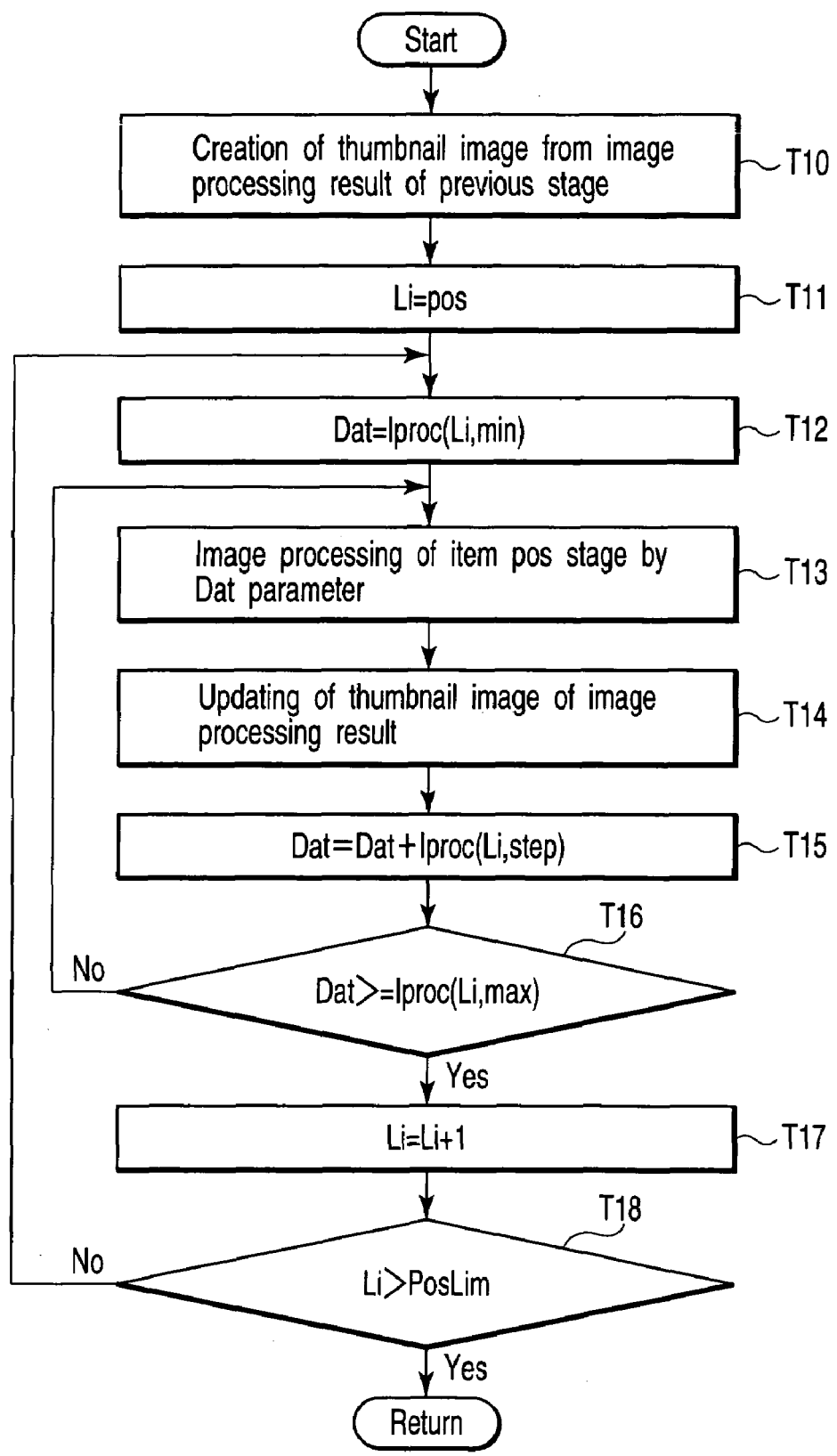
FIG. 14 is a flowchart schematically showing procedure for image display processing for each image processing parameter.

In a step S23, image display processing is executed for each image processing parameter shown in FIG. 14. FIG. 14 is a flowchart schematically showing a procedure of image display processing for each image processing parameter.

In a step T10, a thumbnail image which becomes a reference is created from an image processing result of a previous stage. Then, in a step T11, processing of an image display area 102 of a stage designated by a variable pos is started.

In steps T12 to T16, based on a value of changing an Li-th image processing parameter from a minimum value (min) to a maximum value (max) by a step number (step) unit, image processing is carried out for a processing result image selected at a (pos-Li) stage, and a thumbnail image of an image processing result is displayed or updated to be displayed in the image processing result display area 102.

Then, in steps T17 to T18, this processing is repeated until the image processing result display area 102 of the lowermost stage.

Returning to FIG. 11, in a step S24, an input by user's mouse or key operation is received, and the following processing is executed corresponding to the operation.

In steps S25 and S26, when the user uses the mouse to click the processing result image 104 twice, the image is enlarged to be displayed. Accordingly, the user can enlarge and check image processing effects.

In a step S27, when the close button 202 is pressed, the image processing window is closed. In a step S28, when the application button 201 is pressed, jumping to a step S42 of FIG. 12, image processing is executed for the original image based on image processing parameters checked thus far, and a result thereof is displayed in the display unit 401.

When the clear button 203 of the lowermost stage is pressed in a step S30 of FIG. 12, in a step S31, the image processing result display area 102 of the lowermost stage is deleted to erase all the processing result images 104. Then, in steps S32 to S34, if a selected stage is a lowermost stage, values of variables indicating the selection stage and the lowermost stage are changed to values indicating stages one step higher.

In steps S37 and S38, when the user clicks the processing result image 104, a corresponding image processing parameter Is saved, and the process moves to processing of a next stage.

In steps S39 to S41, the value of the variable is corrected so as to prevent the selection stage (pos) from exceeding a selection stage lower limit (PosLim), and then the process from the step S23 is executed for all the image processing items.

Subsequently, when an image processing parameter is selected at a lowermost stage N, in a step S42, image processing is executed based on the image processing parameters established thus far, a result thereof is displayed in the display unit 401, and the image processing is finished.

According to the embodiment, in the steps S41 and S42, when the lowermost stage N is selected, the image processing is automatically executed based on the established image processing parameters. However, the invention is not limited to this form. When the application button 201 is pressed, the image processing may be executed based on the established image processing parameters, and the processing result image may be displayed in the display unit 401.

Furthermore, the embodiment has been described by assuming the JPEG or BMP image obtained by photographing by the digital camera or the like as the original image. However, even RAW data which is photograph data can be processed. In this case, the step T18 of FIG. 14 is branched at Yes, then image processing of subsequent stages for which no parameters have been decided is sequentially executed based on a default parameter to generate an image to be displayed, thereby displaying a thumbnail image thereof.

Second Embodiment

A second embodiment is different from the first embodiment only in a configuration of an image processing window. Accordingly, portions similar to those of the first embodiment are denoted by similar reference numerals, and detailed description thereof will be omitted.

Figure 15:
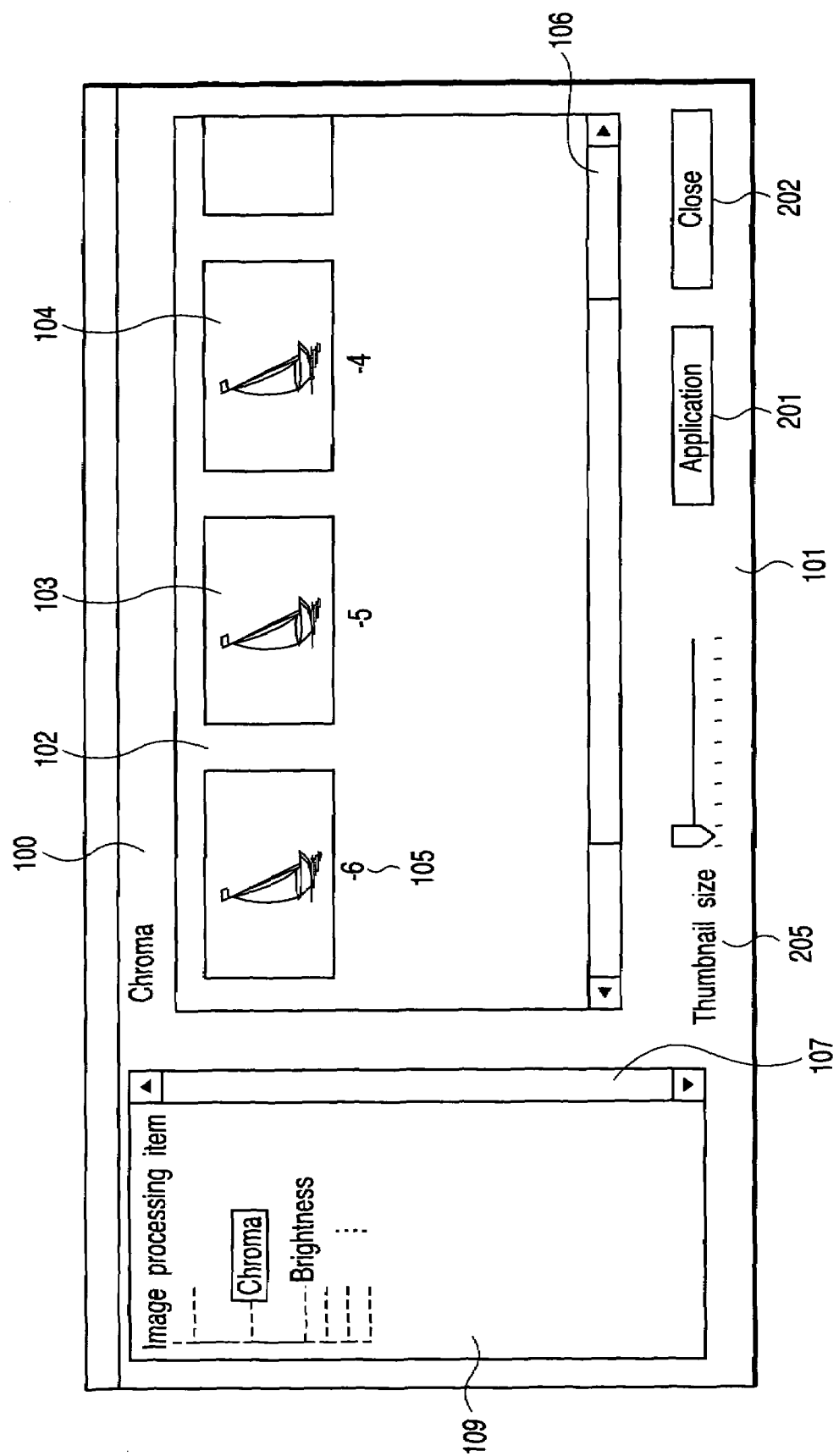
FIG. 15 is a view showing contents of an image processing window of an image processing apparatus according to a second embodiment of the invention.

FIG. 15 is a view showing contents of an image processing window of an image processing apparatus according to a second embodiment of the invention.

The image processing window comprises an image area 100 for selecting image processing conditions or displaying an image processing result, a tool button area 101 having a plurality of operation buttons arranged therein, and an item display area 109 for displaying image processing items.

In the item display area 109, image processing items such as a hue and a chroma are displayed, and a user can select one from the displayed image processing items. In the image area 100, one image processing result display area 102 corresponding to the image processing item selected by the user can be displayed. A plurality of processing result images 104 are displayed in this image processing result display area 102.

The processing result image 104 is an image obtained as a result of subjecting an image 103 selected in the image processing result display area 102 of a previous stage to image processing by using each image processing parameter value 105.

The processing result image 104 can be checked by operating a scroll bar 106 disposed in the image processing result display area 102. The image processing item can be checked by operating a scroll bar 107 disposed in the item display area 102.

In the tool button area 101, an application button 201, a close button 202, and a thumbnail size operation lever 205 are disposed. The image processing can be executed by these operation buttons and the operation lever.

Next, referring to FIG. 15, an outline of an image processing method will be described.

When the user opens the image processing window, an image processing item is displayed in the item display area 109. When the user selects a first image processing item name, e.g., a hue, the image processing result display area 102 is displayed in the image area 100. In the image processing result display area 102, a plurality of processing result images 104 applied by sequentially changing parameter values of the image processing items are displayed. The user selects a desired image 103 from the processing result images, whereby a parameter of the first image processing item is established.

After the selection of the image 103, a second image processing item is automatically selected as a parameter designation target, and the image processing result display area 102 is updated. Thus, new image processing items are selected one by one each time an image is selected.

According to another method of image selection, manual selection is allowed. When the user selects a second image processing item name, e.g., a chroma, in the item display area 109, a new image processing result display area 102 is displayed in the image area 100. In this image processing result display area 102, a plurality of processing result images 104 applied by sequentially changing parameter values of the second image processing item for the image 103 selected by the aforementioned operation are displayed.

When the user selects a third image processing item name, e.g., brightness, in the item display area 109, a new image processing result display area 102 is displayed in the image area 100. Thereafter, an image is similarly selected and processed.

The user sequentially selects a plurality of image processing items, and selects the image processing item which has been selected once again by operating the displayed scroll bar 107, whereby processing results of images selected thus far can be quickly checked. Moreover, by returning to the image processing result display area 102 which has been selected once, the processing result image 104 can be selected all over again.

The thumbnail size operation lever 205 is a lever for changing a size of the processing result image 104. By pressing the application button 201, image processing is performed for the original image by using image processing conditions selected thus far. When the close button 202 is pressed, the image processing window is closed to finish the image processing operation.

Thus, by displaying a processing result image of only one stage, the image processing method can be used even in a narrow display area.

Third Embodiment

A third embodiment is different from the first embodiment in that image history is displayed in an image processing window. Accordingly, portions similar to those of the first embodiment are denoted by similar reference numerals, and detailed description thereof will be omitted.

Figure 16:
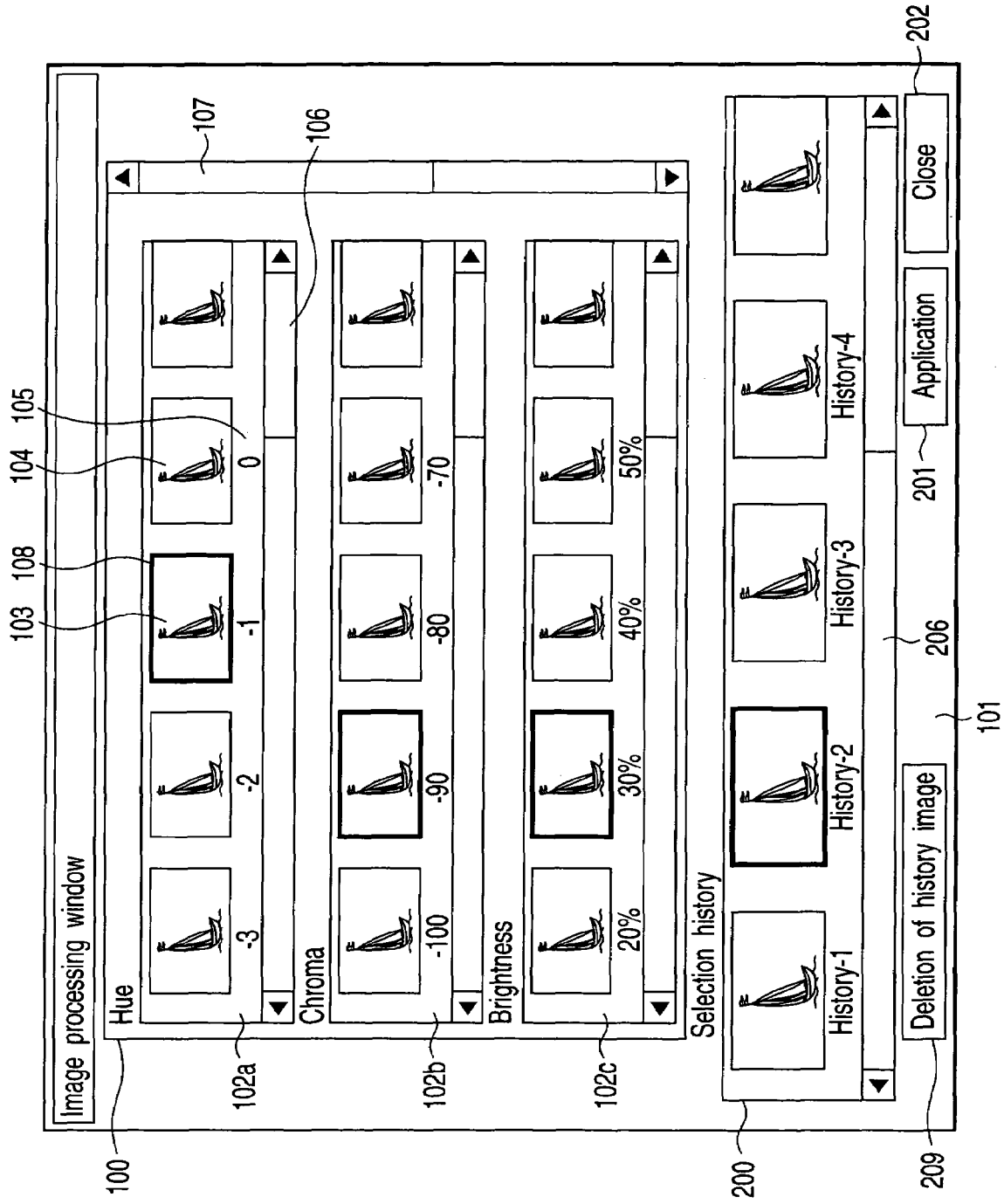
FIG. 16 is a view showing contents of an image processing window of an image processing apparatus according to a third embodiment of the invention.
Figure 17:
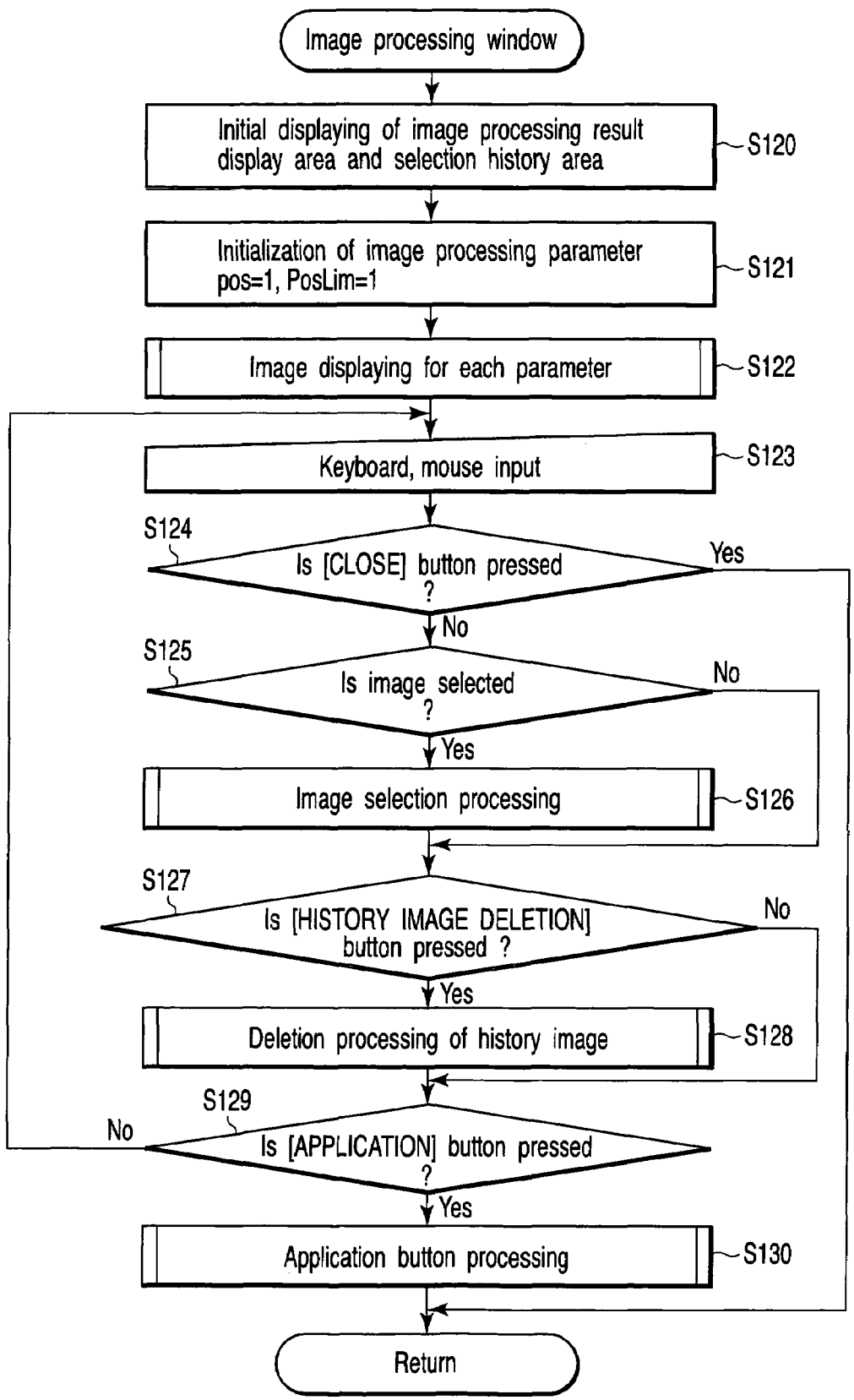
FIG. 17 is a flowchart schematically showing a procedure for image processing.

FIG. 16 is a view showing contents of an image processing window of an image processing apparatus according to the third embodiment of the invention.

The image processing window comprises an image area 100 for selecting image processing conditions or displaying an image processing result, a tool button area 101 having a plurality of operation buttons arranged therein, and a selection history display area 200 for displaying history of selected images.

In the image area 100, image processing result display areas 102 of plural stages can be displayed. Each of the image processing result display areas is disposed for each image processing item such as a hue, a chroma or brightness. A plurality of processing result images 104 are displayed in each of the image processing result display areas 102.

The processing result image 104 is an image obtained as a result of setting a processing result image 103 selected in the image processing result display area 102a of a stage one step higher as a new processing target image, and subjecting the processing target image to image processing by using each image processing parameter value 105.

When the processing result image 104 cannot be displayed on one screen, it can be checked by operating a scroll bar 106 disposed in each image processing result display area 102. The image processing result display area 102 can be checked by operating a scroll bar 107 disposed in an image processing window. It is to be noted that the selected processing result image is displayed by being surrounded with a selection frame 108.

In the selection history display area 200, history of the processing result image 103 selected in the image processing result display area 102 is displayed. When the history image cannot be displayed on one screen, it can be checked by operating a scroll bar 206 disposed in the window.

In the tool button area 101, an application button 201, a close button 202 and a history image deletion button 209 are disposed. The image processing can be executed by these operation buttons.

Next, referring to FIG. 16, an outline of an image processing method will be described.

When the user opens the image processing window, a first image processing item name, e.g., a hue, is displayed in the image processing result display area 102a of a first stage, and a plurality of processing result images 104 applied by sequentially changing parameter values of the image processing item are displayed. This processing target image is set as an original image or an image obtained by resizing the original image.

When the user selects a desired image 103 from the plurality of processing result images 104, the image processing result display area 102b of a second stage displaying a second image processing item name, e.g., a chroma, is displayed. In this image processing result area 102b of the second stage, parameter values of the second image processing item name are sequentially changed to display a plurality of processing result images 104b applied to the image 103 selected in the image processing result display area 102a of the first stage.

When the user selects a desired image 103 from the plurality of processing result images 104, the image processing result display area 102c of a third stage displaying a third image processing item name, e.g., brightness, is displayed. Thereafter, an image is similarly selected and processed.

The user sequentially selects images 103 from the plurality of processing result images 104 in the image processing result display areas 102 of the plural stages to display new image processing result areas 102. However, when all the image processing result display areas 102 cannot be displayed, a scroll bar 107 is displayed. By this scroll bar 107, processing history of the images selected thus far can be quickly checked.

The selected image and image processing parameter are recorded as history information, and the selected image is added and displayed in the selection history display area 200. In other words, the image is displayed in the selection history display area 200 each time the image is selected in the image processing result display area 102.

The application button 201 is permitted to be operated after the image 103 is selected in the image processing result display area 102a of the first stage. By pressing this application button 201 after the selection of images of the first stage, image processing is performed for the original image by using selected image processing conditions.

By pressing the history image deletion button 209, the history information can be deleted. By designating a plurality of images through the mouse and pressing the history image deletion button 209, batch deletion can be carried out. When the close button 202 is pressed, the image processing window is closed to finish the image processing operation.

Next, an image processing procedure of the image processing window shown in FIG. 16 will be described. It is to be noted that processing described below concerns main ones of image processing functions. Thus, even functions not described below, and the functions described above with reference to the drawing are included in the image processing functions.

FIGS. 17 to 21 are flowcharts schematically showing an image processing procedure.

When the user opens the image processing window, in a step S120, the image processing result display area 102 and the selection history display area 200 are initialized. That is, image processing result display areas 102 of plural stages are displayed in the image area 100. For example, in the image processing result display area 102 of the first stage, a processing result image of a hue is displayed by using a default image processing parameter. In the selection history display area 200, no image is displayed because no image is selected.

Then, in a step S121, a value (pos) of a selection stage and a selection stage display limiter (PosLim) which are internal variables used for the following processing thereafter are initialized.

In a step S122, an original image is set as a processing target image, processing similar to that of the first embodiment described above with reference to FIG. 14 is executed, and a processing result image 104 is newly displayed or updated to be displayed in the image processing result display area 102. As a result, in the image processing result display area 102a of the first stage, a plurality of result thumbnail images subjected to image processing by changing parameter of the hue are displayed.

Next, in a step S123, the process stands by until the user inputs an operation by using the keyboard, the mouse or the like. When there is an input, processing is executed in accordance with the input.

In a step S124, when the close button 202 is pressed, the image processing window is closed to finish the processing.

Figure 18:
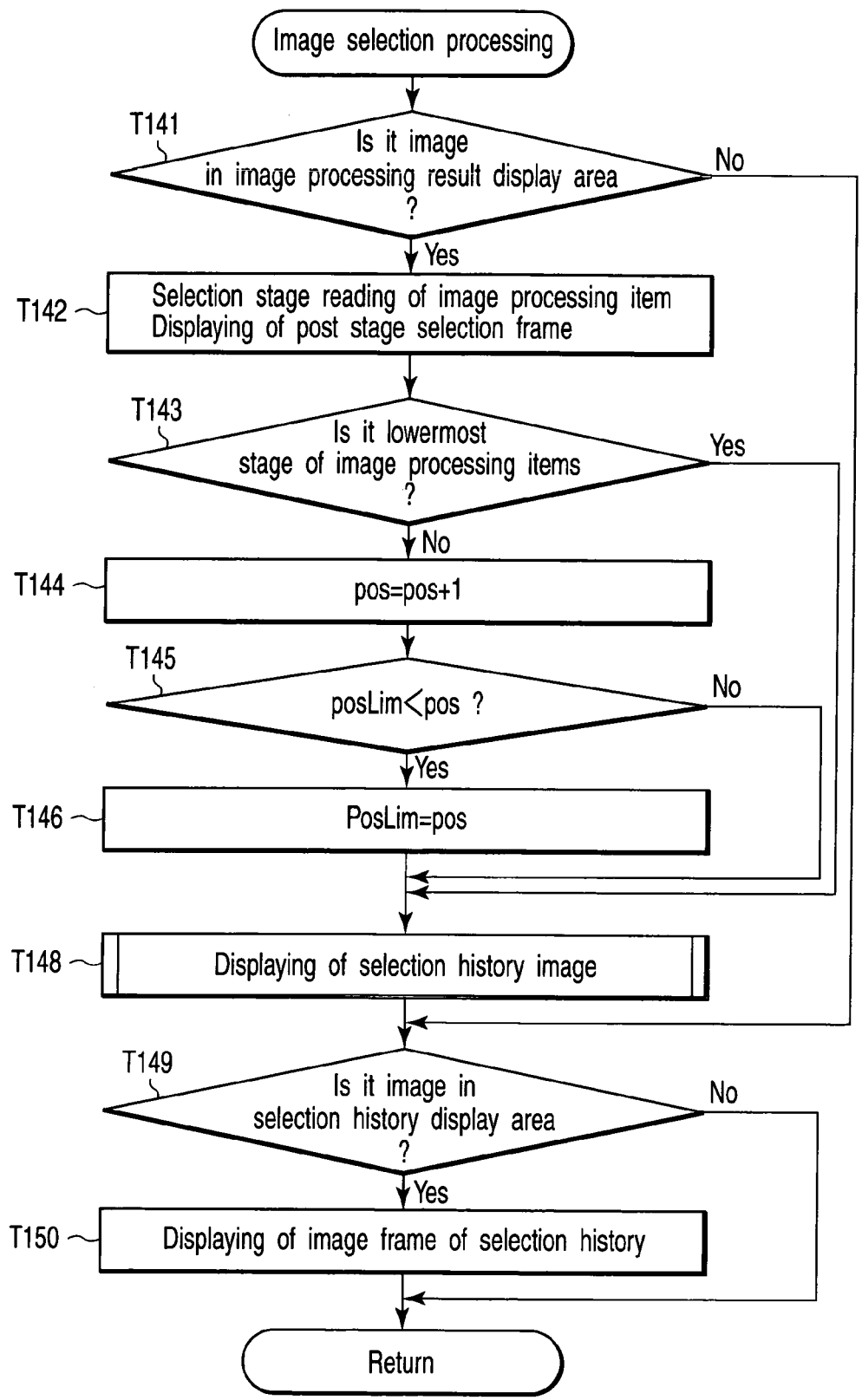
FIG. 18 is a flowchart schematically showing image selection processing.

When an image is selected in a step S125, in a step S126, image selection processing shown in FIG. 18 is executed. If a selected image is a processing result image 104 in the image processing result display area 102 in a step T141 of FIG. 18, in a step T142, the number of stages of the image processing result display area 102 is set to a value of selected stage (pos), and a selection frame 108 is displayed in the selected processing result image 104.

If a selected image is the processing result image 104 in the image processing result display area 102 of a last image processing item in a step T143, the process proceeds to a display step T148 of a selection history image. On the other hand, if the selected image is a display result image in the image processing result display area 102 other than that of the last stage, in steps T144 and T145, among the displayed image processing result display areas 102, a selection stage display limiter variable (PosLim) indicating a lowermost stage of the image processing result area is incremented in step T146, when the image of the image processing result display area of the last stage is selected, and not incremented otherwise.

Figure 19:
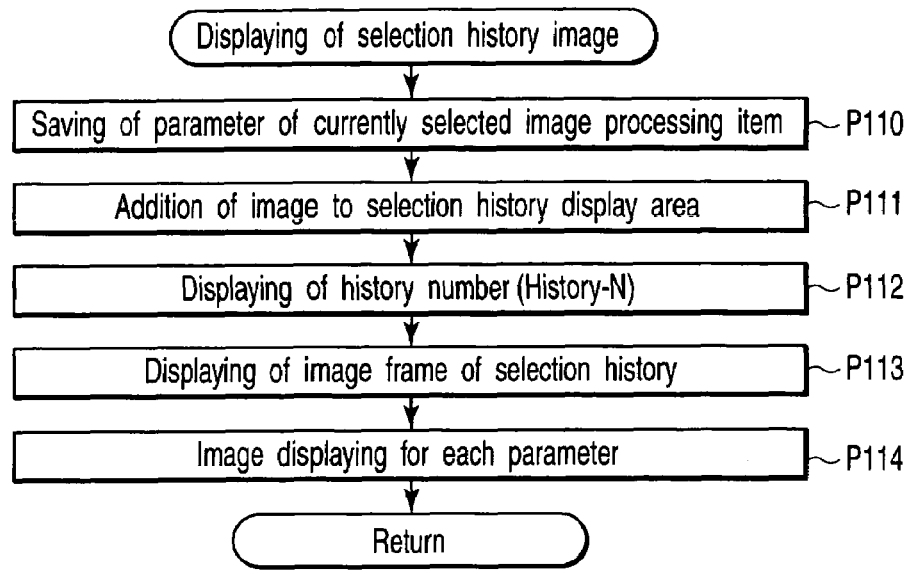
FIG. 19 is a flowchart schematically showing display processing of a selection history image.

Next, in the step T148, display processing of a selection history image shown in FIG. 19 is executed. In a step P110 of FIG. 19, an image processing parameter corresponding to a currently selected processed image 103 is saved as history information. In steps P111 to P113, the selected image is added to be displayed in the selection history display area 200, and a history display (History-N) and the selection frame 108 are displayed. Then, in a step P114, processing similar to that of the first embodiment described above with reference to FIG. 14 is executed, and a processing result image 104 is newly displayed or updated to be displayed in the image processing result display area 102.

In steps T149 and T150 of FIG. 18, if the selected image is a history image in the selection history display area 200, the selection frame 108 is displayed in a corresponding image 104 in the image area 100, and the process returns.

Figure 20:
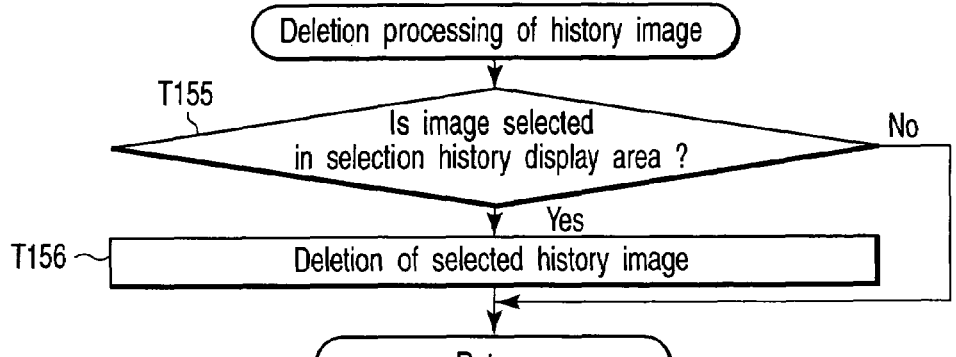
FIG. 20 is a flowchart schematically showing history image deletion processing.

Returning to FIG. 17, when the history image deletion button 209 is operated in a step S127, history image deletion processing shown in FIG. 20 is executed in a step S128. In steps T155 and T156 of FIG. 20, selected history images in the selection history display area 20 are investigated, the history images are deleted, and the process returns. It is to be noted that the history images can be deleted en bloc.

Figure 21:
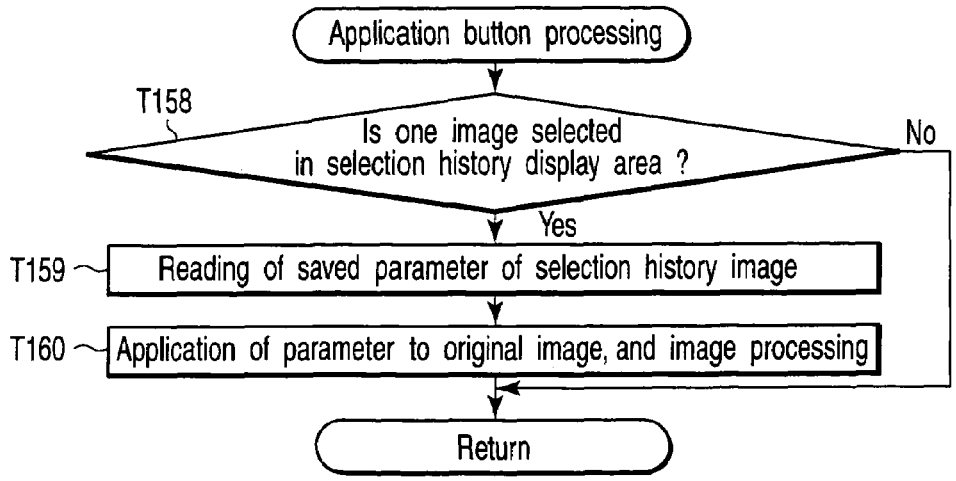
FIG. 21 is a flowchart schematically showing application button processing.

Returning to FIG. 17, when the application button 201 is pressed, application button processing shown in FIG. 21 is executed in a step S130. In steps T158 to T160 of FIG. 21, investigation is made as to whether the number of history images selected in the selection history display area 200 is one or not. If the number is one, an image processing parameter is read from saved history information regarding the selected history image. Then, the image parameter is applied to the original image to perform image processing, and the process returns.

Returning to FIG. 17, after execution of processing in accordance with the inputs, a standby stage is set to wait for an operation input from the user again in the step S123. However, after execution of the application button processing of the step S130, the image processing window is finished.

Fourth Embodiment

A fourth embodiment is different from the first embodiment only in a structure of an image processing window. Accordingly, portions similar to those of the third embodiment are denoted by similar reference numerals, and detailed description thereof will be omitted.

Figure 22:
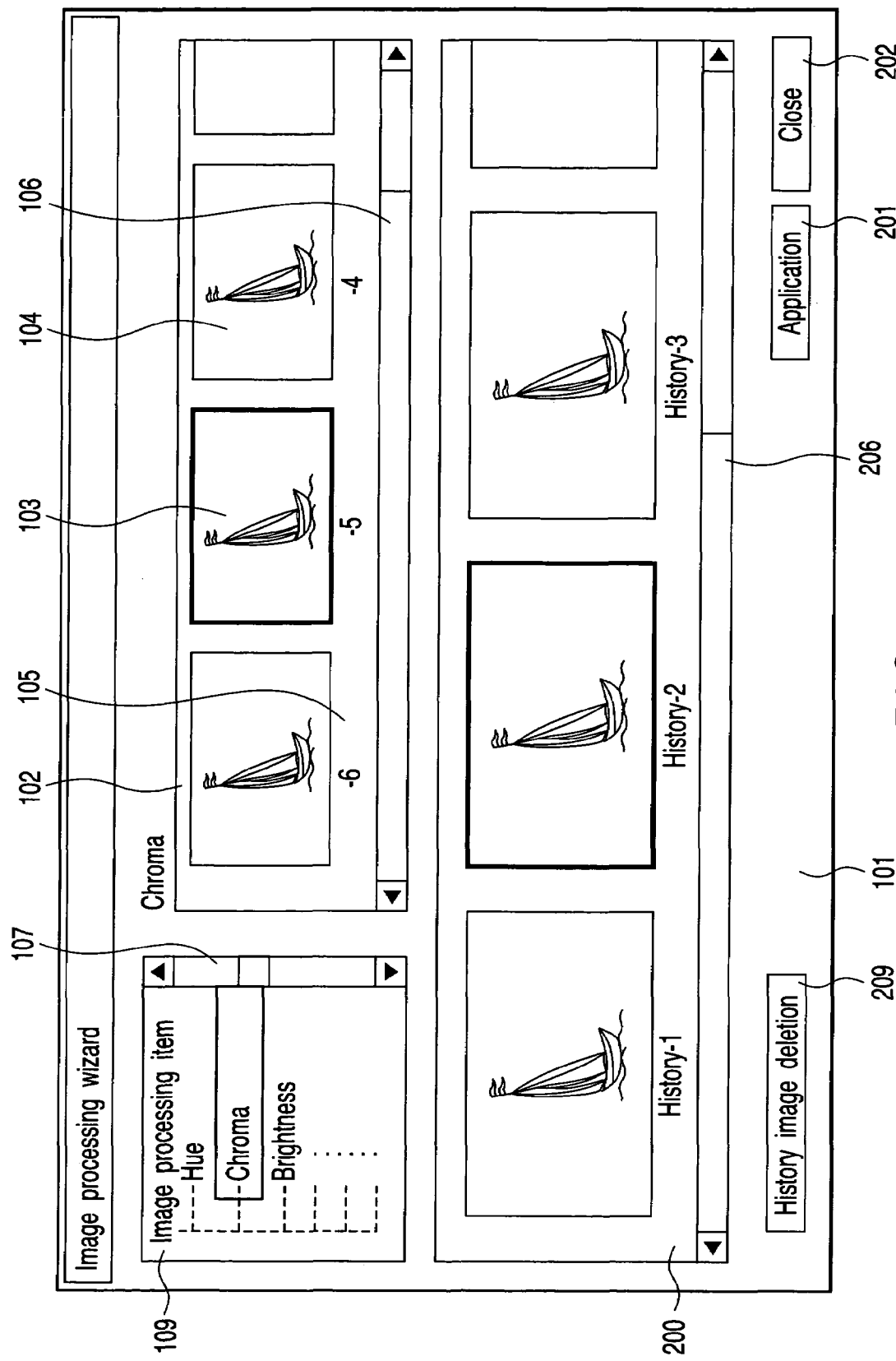
FIG. 22 is a view showing contents of an image processing window of an image processing apparatus according to a fourth embodiment of the invention.

FIG. 22 is a view showing contents of an image processing window of an image processing apparatus according to the fourth embodiment of the invention.

The image processing window comprises an image area 100 for selecting image processing conditions or displaying an image processing result, a tool button area 101 having a plurality of operation buttons arranged therein, a selection history display area 200 for displaying history of selected images, and an item display area 109 for displaying image processing items.

In the item display area 109, image processing items such as a hue, a chroma and brightness are displayed, and a user can select one from the displayed image processing items. In the image area 100, one image processing result display area 102 corresponding to the image processing item selected by the user can be displayed. A plurality of processing result images 104 are displayed in this image processing result display area 102.

The processing result image 104 is an image obtained as a result of subjecting an image 103 selected in the image processing result display area 102 of a previous stage to image processing by using each image processing parameter value 105.

The processing result image 104 can be checked by operating a scroll bar 106 disposed in the image processing result display area 102. The image processing item can be checked by operating a scroll bar 107 disposed in the item display area 109.

In the selection history display area 200, history of the processing result image 103 selected in the image processing result display area 102 is displayed. When the history image cannot be displayed on one screen, it can be checked by operating a scroll bar 206 disposed in the window.

In the tool button area 101, an application button 201, a close button 202 and a history image deletion button 209 are disposed. The image processing can be executed by these operation buttons.

Next, referring to FIG. 22, an outline of an image processing method will be described.

When the user opens the image processing window, image processing items are displayed in the item display area 109. When the user selects a first image processing item name, e.g., a hue, the image processing result display area 102 is displayed in the image area 100. In the image processing result display area 102, a plurality of processing result images 104 applied by sequentially changing parameter values of the image processing item are displayed. The user selects a desired image 103 from the processing result images 104, and a parameter of the image processing item is established.

After the selection of the image 103, a second image processing item name is automatically selected, and the image processing result display area 102 is updated. Thus, new image processing items are selected one by one each time an image is selected.

According to another image selection method, manual selection is also possible. When the user selects a second image processing item name, e.g., a chroma, a new image processing result display area 102 is displayed in the image area 100. In this image processing result display area 102, a plurality of processing result images 104 applied by sequentially changing parameter values of the second image processing item name are displayed for the image 103 selected by the aforementioned operation.

When the user selects a third image processing item name, e.g., brightness, a new image processing result display area 102 is displayed in the image area 100. Thereafter, an image is similarly selected and processed.

The user sequentially selects a plurality of image processing items, and the image processing items selected once are selected again by operating the scroll bar 107, or a cursor key of the keyboard or the like, whereby processing history of the images selected thus far can be quickly checked. Moreover, by returning to the image processing result display area 102 selected once, a processing result image 104 can be selected again.

The selected image 103 and the selected image processing parameter are recorded as history information, and the selected image is added to be displayed in the selection history display area 200. In other words, the image is registered in the selection history display area 200 each time the processing image displayed in the image processing result display area 102 is selected by the mouse.

According to the foregoing image processing apparatus of the first embodiment, the image processing window is displayed, which comprises plural stages of image processing result display areas displaying a list of images whose image processing parameters are sequentially changed. By selecting an image in each image processing result display area, processed images using image processing parameters selected until the previous stage are displayed in image processing result display areas of subsequent stages. Thus, by sequentially selecting the images in the image processing result display areas of the plural stages, the user can decide an image processing parameter value of a previous stage while checking a processing result of image processing of a subsequent stage for which parameter must be decided, and efficiently select an image having desired image processing effects at the end.

Additionally, the selected image in the image processing result display area can be selected all over again, and a result of the selection can be reflected on the image in the other image processing result display area.

Furthermore, the sequence of the image processing items can be optionally set by the user. Thus, the user can smoothly select an image.

According to the image processing apparatus of the second embodiment, the item display area is newly disposed to display the image processing items, and one image processing result display area is switched to be displayed by selecting the image processing items. Thus, it is possible to further improve operability since the number of scroll bar operations is reduced.

According to the image processing apparatus of the third and fourth embodiments, the selected image is registered and displayed in the selection history display area. Thus, the processing history of the image selected thus far can be quickly checked to return it to the past parameter selected state.

It is to be noted that the aforementioned functions of the embodiments may be configured by using hardware, or realized by causing a computer to read programs in which the functions are written through software. Additionally, each function may be configured by properly selecting software or hardware.

Furthermore, the functions can be realized by causing the computer to read programs stored in a storage medium. Here, any recording formats can be employed as long as the programs can be recorded in the storage medium of the embodiment and the computer can read the programs from the storage medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A computer readable medium storing a computer program which executes a plurality of image quality adjustment processing operations of different kinds for an image, the computer program causing a computer to perform the following operations:

first image setting processing which sets an original image as a processing target image to adjust its image quality;

first image processing setting processing which sets a kind of image quality adjustment processing executed for the processing target image as application image processing;

parameter setting processing which sets a plurality of predetermined processing parameter values used in the application image processing;

processing result image generation processing which executes the application image processing for the processing target image based on the parameter values set in the parameter setting processing to generate a plurality of processing result images;

reduced image generation processing which generates reduced images of the processing result images;

reduced image display processing which displays the reduced images generated in the reduced image generation processing;

reduced image selection processing which selects one of the plurality of reduced images displayed in the reduced image display processing;

parameter value deciding processing which decides the processing parameter values of the processing result image corresponding to the reduced image selected in the reduced image selection processing as a processing parameter values of the application image processing;

second image setting processing which sets the processing result image corresponding to the reduced image selected in the reduced image selection processing as a new processing target image;

second image processing setting processing which sets another kind of image quality adjustment processing to be executed next as new application image processing; and repeated execution control processing which repeatedly executes the process from the parameter setting processing to the second image processing setting processing.

2. The computer readable medium according to claim 1, wherein the processing result image generation processing performs the application image processing for the processing target image by using the processing parameter values of the application image processing decided in the parameter value deciding processing, and image processing operations of kinds whose processing parameters have been undecided by using processing parameter values of predetermined default values.

3. The computer readable medium according to claim 1, wherein the reduced image display processing displays a plurality of reduced images generated for each repetition of the application image processing in array on the same screen.

4. The computer readable medium according to claim 1, wherein the stored computer program further causes the computer to perform the following operations:

second reduced image selection processing which selects one of the plurality of reduced images having the decided processing parameter values;

processing parameter value changing processing which changes the decided processing parameter values to the processing parameter values of the application image processing corresponding to the reduced image selected in the second reduced image selection processing;

changed image processing which sets a processing result image corresponding to the reduced image selected in the second reduced image selection processing as a processing target image of next image processing, and executes corresponding image processing by using decided processing parameter values from the image processing corresponding to the reduced image selected in the second reduced image selection processing to image processing of kinds whose parameter values have been decided; and reduced image updating processing which updates the displayed reduced image by a reduced image of an image of the changed image processing result.

5. The computer readable medium according to claim 1, wherein the stored computer program further causes the computer to perform the following operation:

image processing sequence setting processing which sets a processing sequence of the plurality of image processing operations of the different kinds.

6. The computer readable medium according to claim 1, wherein the stored computer program further causes the computer to perform the following operations:

second reduced image selection processing which selects one from the plurality of reduced images having the decided processing parameter values;

history display processing which displays the reduced image selected in the second reduced image selection processing as a history image in a predetermined display area of a display; and history information storage processing which stores a processing parameter value of the image processing executed for the history image as history information.

7. The computer readable medium according to claim 1, wherein the stored computer program further causes the computer to perform the following operation:

original image processing which subjects the original image to image processing based on the history information corresponding to the history image stored in the history information storage processing when the history image is specified and instructed to be subjected to image processing.

8. The computer readable medium according to claim 1, wherein the stored computer program further causes the computer to perform the following operation:

history display processing which displays the new processing target image set in the second image setting processing as a history image in a predetermined display area of the display; and history information storage processing which stores the processing parameter value of the image processing executed for the history image as history information.

9. The computer readable medium according to claim 8, wherein the stored computer program further causes the computer to perform the following operation:

original image processing which subjects the original image to image processing based on the history information corresponding to the history image stored in the history information storage processing when the history image is specified and instructed to be subjected to image processing.

10. The computer readable medium according to claim 1, wherein the reduced images generated correspond to the original image with at least one processing parameter value altered.

11. An image processing apparatus which executes a plurality of image quality adjustment processing operations of different kinds for an image, comprising:
   a first image setting processing which sets an original image as a processing target image to adjust its image quality;
   a first image processing setting processing which sets a kind of image quality adjustment processing executed for the processing target image as application image processing;
   a parameter setting unit which sets a plurality of predetermined processing parameter values used in the application image processing;
   a processing result image generation unit which executes the application image processing for the processing target image based on the parameter values set by the parameter setting unit to generate a plurality of processing result images;
   a reduced image generation unit which generates reduced images of the processing result images;
   a reduced image display unit which displays the reduced images generated by the reduced image generation unit;
   a reduced image selection unit which selects one of the plurality of reduced images displayed by the reduced image display unit;
   a parameter value deciding unit which decides the processing parameter values of the processing result image corresponding to the reduced image selected by the reduced image selection unit as a processing parameter values of the application image processing;
   a second image setting unit which sets the processing result image corresponding to the reduced image selected by the reduced image selection unit as a new processing target image;
   a second image processing setting unit which sets another kind of image quality adjustment processing to be executed next as new application image processing; and
   a repeated execution control unit which repeatedly executes the process from the processing of the parameter setting unit to the processing of the second image processing setting unit.

12. The image processing apparatus according to claim 11, wherein the processing result image generation unit performs the application image processing for the processing target image by using the processing parameter values of the application image processing decided by the parameter value deciding unit, and image processing operations of kinds whose processing parameters have been undecided by using processing parameter values of predetermined default values.

13. The image processing apparatus according to claim 11, wherein the reduced image display unit displays a plurality of reduced images generated for each repetition of the application image processing in array on the same screen.

14. The image processing apparatus according to claim 11, which further comprises:
   a second reduced image selection unit which selects one of the plurality of reduced images having the decided processing parameter values;
   a processing parameter value changing unit which changes the decided processing parameter values to the processing parameter values of the application image processing corresponding to the reduced image selected by the second reduced image selection unit;
   a changed image processing unit which sets a processing result image corresponding to the reduced image selected by the second reduced image selection unit as a processing target image of next image processing, and executes corresponding image processing by using decided processing parameter values from the image processing corresponding to the reduced image selected by the second reduced image selection unit to image processing of kinds whose parameter values have been decided; and
   a reduced image updating processing unit which updates the displayed reduced image by a reduced image of an image processed by the changed image processing unit.

15. The image processing apparatus according to claim 11, which further comprises an image processing sequence setting unit which sets a processing sequence of the plurality of image processing operations of the different kinds.

16. The image processing apparatus according to claim 11, which further comprises:
   a second reduced image selection unit which selects one from the plurality of reduced images having the decided processing parameter values;
   a history display unit which displays the reduced image selected by the second reduced image selection unit as a history image in a predetermined display area of a display; and
   a history information storage unit which stores a processing parameter value of the image processing executed for the history image as history information.

17. The image processing apparatus according to claim 16, which further comprises an original image processing unit which subjects the original image to image processing based on the history information corresponding to the history image stored by the history information storage unit when the history image is specified and instructed to be subjected to image processing.

18. The image processing apparatus according to claim 11, which further comprises:
   a history display unit which displays the new processing target image set by the second image setting unit as a history image in a predetermined display area of the display; and
   a history information storage unit which stores the processing parameter value of the image processing executed for the history image as history information.

19. The image processing apparatus according to claim 18, which further comprises an original image processing unit which subjects the original image to image processing based on the history information corresponding to the history image stored in the history information storage processing when the history image is specified and instructed to be subjected to image processing.

20. The image processing apparatus according to claim 11, wherein the reduced images generated correspond to the original image with at least one processing parameter value altered.

* * * * *